(12) United States Patent
Popovic

(10) Patent No.: US 8,116,603 B2
(45) Date of Patent: Feb. 14, 2012

(54) LOW-LOSS BLOCH WAVE GUIDING IN OPEN STRUCTURES AND HIGHLY COMPACT EFFICIENT WAVEGUIDE-CROSSING ARRAYS

(75) Inventor: Milos Popovic, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/985,824

(22) Filed: Jan. 6, 2011

(65) Prior Publication Data
US 2011/0158584 A1 Jun. 30, 2011

Related U.S. Application Data

(62) Division of application No. 12/288,716, filed on Oct. 22, 2008, now Pat. No. 7,903,909.

(60) Provisional application No. 60/981,597, filed on Oct. 22, 2007.

(51) Int. Cl.
*G02B 6/26* (2006.01)
(52) U.S. Cl. .......................................... 385/28; 385/27
(58) Field of Classification Search .................. 385/28, 385/27
See application file for complete search history.

(56) References Cited

U.S. PATENT DOCUMENTS

| | | | |
|---|---|---|---|
| 3,558,213 A | 1/1971 | Marcatili | |
| 4,142,775 A | 3/1979 | Ramaswamy et al. | |
| 4,679,893 A | 7/1987 | Ramer | |
| 4,852,117 A | 7/1989 | Po | |
| 5,241,616 A * | 8/1993 | Garcia | 385/126 |
| 5,371,817 A * | 12/1994 | Revelli et al. | 385/44 |
| 5,592,500 A | 1/1997 | Shirasaki | |
| 5,625,403 A | 4/1997 | Hazman | |
| 5,900,637 A | 5/1999 | Smith | |
| 6,025,943 A | 2/2000 | Meekers et al. | |
| 6,052,495 A | 4/2000 | Little et al. | |
| 6,289,151 B1 | 9/2001 | Kazarinov et al. | |
| 6,442,311 B1 | 8/2002 | Barbarossa et al. | |
| 6,480,644 B1 | 11/2002 | MacDonald | |
| 6,529,277 B1 | 3/2003 | Weitekamp | |
| 6,563,631 B2 | 5/2003 | Delprat et al. | |
| 6,636,669 B1 | 10/2003 | Chin et al. | |
| 6,668,111 B2 | 12/2003 | Tapalian et al. | |
| 6,711,200 B1 | 3/2004 | Scherer et al. | |
| 6,829,269 B2 * | 12/2004 | Goodhue et al. | 372/43.01 |
| 6,839,482 B2 | 1/2005 | Margalit | |
| 6,847,750 B1 | 1/2005 | Baumann et al. | |
| 6,891,996 B2 * | 5/2005 | Sercel et al. | 385/30 |
| 6,947,632 B2 | 9/2005 | Fischer | |

(Continued)

FOREIGN PATENT DOCUMENTS
EP 0 646 832 A2 4/1995
(Continued)

OTHER PUBLICATIONS

Altug et al., "Ultrafast Photonic Crystal Nanocavity Laser," Nature Physics 2 (2006) pp. 484-488.

(Continued)

*Primary Examiner* — K. Cyrus Kianni
(74) *Attorney, Agent, or Firm* — Goodwin Procter LLP

(57) ABSTRACT

Low-loss waveguide structures may comprise a multimode waveguide supporting a periodic light intensity pattern, and attachments disposed at the waveguide adjacent low-intensity regions of the light intensity pattern.

10 Claims, 26 Drawing Sheets

U.S. PATENT DOCUMENTS

| | | | |
|---|---|---|---|
| 7,062,126 B2 | 6/2006 | Kersey et al. | |
| 7,102,469 B2 | 9/2006 | Kim et al. | |
| 7,110,632 B2 | 9/2006 | Abeles | |
| 7,123,800 B2 | 10/2006 | Kaplan | |
| 7,145,660 B2 | 12/2006 | Margalit et al. | |
| 7,149,378 B2 | 12/2006 | Baumann et al. | |
| 7,164,838 B2 | 1/2007 | Blauvelt et al. | |
| 7,200,308 B2* | 4/2007 | Hochberg et al. | 385/122 |
| 7,215,848 B2 | 5/2007 | Tan et al. | |
| 7,292,751 B2 | 11/2007 | Popovic | |
| 7,339,724 B2* | 3/2008 | Hochberg et al. | 359/335 |
| 7,424,192 B2* | 9/2008 | Hochberg et al. | 385/122 |
| 7,446,880 B2* | 11/2008 | Vollmer et al. | 356/480 |
| 7,450,811 B2 | 11/2008 | Hashimoto | |
| 7,539,375 B2 | 5/2009 | Popovic | |
| 7,583,874 B2 | 9/2009 | Rakich et al. | |
| 7,643,714 B2* | 1/2010 | Hochberg et al. | 385/122 |
| 7,693,369 B2* | 4/2010 | Fan et al. | 385/32 |
| 7,903,909 B2 | 3/2011 | Popovic | |
| 7,973,265 B2 | 7/2011 | Chu et al. | |
| 2001/0040681 A1 | 11/2001 | Paiam et al. | |
| 2001/0046344 A1 | 11/2001 | Hayashi et al. | |
| 2002/0039470 A1* | 4/2002 | Braun et al. | 385/50 |
| 2002/0076149 A1* | 6/2002 | Deacon | 385/27 |
| 2002/0076188 A1 | 6/2002 | Kimerling et al. | |
| 2002/0081055 A1* | 6/2002 | Painter et al. | 385/2 |
| 2002/0122648 A1 | 9/2002 | Mule' et al. | |
| 2002/0136481 A1 | 9/2002 | Mule' et al. | |
| 2002/0172466 A1 | 11/2002 | Baumann et al. | |
| 2003/0015770 A1 | 1/2003 | Talin et al. | |
| 2003/0016907 A1* | 1/2003 | LoCascio et al. | 385/27 |
| 2003/0021301 A1* | 1/2003 | Vahala et al. | 372/3 |
| 2003/0128922 A1 | 7/2003 | Kolodziejski et al. | |
| 2003/0138178 A1 | 7/2003 | Kimerling et al. | |
| 2003/0156780 A1 | 8/2003 | Margalit et al. | |
| 2003/0174974 A1 | 9/2003 | Yasuda et al. | |
| 2003/0210860 A1 | 11/2003 | Margalit | |
| 2003/0219052 A1* | 11/2003 | Goodhue et al. | 372/45 |
| 2004/0008942 A1 | 1/2004 | Scheuer et al. | |
| 2004/0008968 A1 | 1/2004 | Lee et al. | |
| 2004/0013355 A1 | 1/2004 | Margalit | |
| 2004/0056243 A1 | 3/2004 | Atanackovic et al. | |
| 2004/0114899 A1 | 6/2004 | Mattsson | |
| 2004/0146431 A1* | 7/2004 | Scherer et al. | 422/82.05 |
| 2004/0161188 A1 | 8/2004 | Su et al. | |
| 2004/0197051 A1* | 10/2004 | Sercel et al. | 385/39 |
| 2005/0036737 A1 | 2/2005 | Stuart | |
| 2005/0068602 A1 | 3/2005 | Tormen et al. | |
| 2005/0077526 A1 | 4/2005 | Shin et al. | |
| 2005/0147348 A1 | 7/2005 | Grunnet-Jepsen et al. | |
| 2005/0163418 A1 | 7/2005 | Wong et al. | |
| 2005/0259937 A1* | 11/2005 | Whaley et al. | 385/132 |
| 2005/0275921 A1 | 12/2005 | Haus et al. | |
| 2006/0029325 A1 | 2/2006 | Fardi et al. | |
| 2006/0034569 A1 | 2/2006 | Shih et al. | |
| 2006/0083456 A1 | 4/2006 | Burns et al. | |
| 2006/0134535 A1 | 6/2006 | Porque | |
| 2006/0198566 A1 | 9/2006 | Watts | |
| 2006/0222038 A1* | 10/2006 | Yamazaki | 372/94 |
| 2006/0227331 A1* | 10/2006 | Vollmer et al. | 356/483 |
| 2006/0239614 A1 | 10/2006 | Montgomery et al. | |
| 2006/0274995 A1* | 12/2006 | Lee et al. | 385/37 |
| 2006/0291791 A1* | 12/2006 | Hochberg et al. | 385/132 |
| 2007/0035800 A1* | 2/2007 | Hochberg et al. | 359/237 |
| 2007/0133934 A1 | 6/2007 | Blauvelt et al. | |
| 2007/0211992 A1 | 9/2007 | Chu et al. | |
| 2007/0230867 A1 | 10/2007 | Chen et al. | |
| 2007/0237460 A1* | 10/2007 | Fan et al. | 385/39 |
| 2007/0253663 A1 | 11/2007 | Keyser et al. | |
| 2008/0002992 A1* | 1/2008 | Hochberg et al. | 398/200 |
| 2008/0007817 A1* | 1/2008 | Hochberg et al. | 359/333 |
| 2008/0013876 A1 | 1/2008 | Gill et al. | |
| 2008/0014534 A1 | 1/2008 | Barwicz et al. | |
| 2008/0044184 A1 | 2/2008 | Popovic | |
| 2008/0166095 A1 | 7/2008 | Popovic et al. | |
| 2008/0199123 A1 | 8/2008 | Pan et al. | |
| 2008/0266639 A1 | 10/2008 | Melloni et al. | |
| 2009/0022445 A1* | 1/2009 | Hochberg et al. | 385/3 |
| 2009/0028492 A1* | 1/2009 | Wu et al. | 385/14 |
| 2009/0032805 A1 | 2/2009 | Ty Tan et al. | |
| 2009/0142019 A1* | 6/2009 | Popovic | 385/28 |
| 2009/0220228 A1 | 9/2009 | Popovic | |
| 2009/0239323 A1 | 9/2009 | Tan et al. | |
| 2009/0256136 A1 | 10/2009 | Tan et al. | |
| 2009/0290835 A1 | 11/2009 | Popovic | |
| 2010/0002994 A1* | 1/2010 | Baehr-Jones et al. | 385/32 |
| 2010/0158429 A1 | 6/2010 | Popovic | |
| 2010/0209038 A1 | 8/2010 | Popovic et al. | |
| 2010/0303122 A1 | 12/2010 | Popovic | |
| 2011/0026879 A1 | 2/2011 | Popovic et al. | |

FOREIGN PATENT DOCUMENTS

| | | |
|---|---|---|
| EP | 0 909 963 A1 | 4/1999 |
| EP | 1 024 378 A2 | 8/2000 |
| EP | 1 241 497 A2 | 9/2002 |
| EP | 1 717 616 A1 | 11/2006 |
| EP | 1 785 771 A2 | 5/2007 |
| JP | 2001-194160 A | 7/2001 |
| WO | WO-8501123 | 3/1985 |
| WO | WO-00/50938 A1 | 8/2000 |
| WO | WO-01/23955 A2 | 4/2001 |
| WO | WO-01/55814 A2 | 8/2001 |
| WO | WO-01/88580 A1 | 11/2001 |
| WO | WO-01/96913 A1 | 12/2001 |
| WO | WO-02/17004 | 2/2002 |
| WO | WO-02/063389 A1 | 8/2002 |
| WO | WO-02/101421 A2 | 12/2002 |
| WO | WO-03/036841 A1 | 5/2003 |
| WO | WO-03/043247 A2 | 5/2003 |
| WO | WO-2005/010618 A2 | 2/2005 |
| WO | WO-2005/104147 A2 | 11/2005 |
| WO | WO-2006/025760 A2 | 3/2006 |
| WO | WO-2006/076585 A2 | 7/2006 |
| WO | WO-2007/086888 A2 | 8/2007 |

OTHER PUBLICATIONS

Badolato et al., "Deterministic Coupling of Single Quantum Dots to Single Nanocavity Modes," Science 308 (2005) pp. 1158-1161.

Baehr-Jones et al., "High-Q Ring Resonators in Thin Silicon-on-Insulator," 85 Appl. Phys. Lett. 16 (Oct. 2004) pp. 3346-3347.

Barbarossa et al., "Novel Double-Ring Optical-Guided-Wave Vernier Resonator," 144 IEE Proc.-Optoelectron. 4, pp. 203-208 (Aug. 1997).

Barbarossa et al., "Theoretical Analysis of Triple-Coupler Ring-Based Optical Guided-Wave Resonator," 13 J. Lightwave Tech. 2, pp. 148-157 (Feb. 1995).

Barbarossa et al., "Triple-Coupler Ring-Based Optical Guided-Wave Resonator," 30 IEEE Electronics Lett. 2, pp. 131-133 (Jan. 20, 1994).

Barwicz et al., "Polarization-transparent microphotonic devices in the Strong Confinement Limit," Nature Photonics 1, pp. 57-60 (Jan. 2007).

Barwicz, "3D analysis of scattering losses due to sidewall roughness in microphotonic waveguides: high index-contrast," 2005 Conf. on Lasers and Electro-Optics (CLEO), vol. 2, pp. 1333-1335.

Batten et al., "Building Manycore Processor-to-DRAM Networks with Monolithic CMOS Si Photonics," IEEE Micro, p. 8-21 (Jul. 2009).

Becker et al., "Optical Properties of Semiconductors. III. Infra-red Transmission of Silicon," 76 Physical Rev. A, pp. 1531-1532 (1949).

Bethe, "Theory of Diffraction by Small Holes," 66 Phys. Rev. 7-8, pp. 163-182 (Oct. 1944).

Bogaerts et al., "Low-loss, low-cross-talk crossings for silicon-on-insulator nanophotonic waveguides," 32 Optics Letters 19, pp. 2801-2803 (1995).

Bozhevolnyi et al., "Channel Plasmon Subwavelength Waveguide Components Including Interferometers and Ring Resonators," Nature 440 (2006) pp. 508-511.

Bustillo et al., "Surface Micromachining for Microelectromechanical Systems," Proc. of the IEEE 86 (1998) pp. 1552-1574.

Campbell et al., "GaAs Electro-Optic Directional-coupler switch," 27 Applied Physics Lett. 4, pp. 202-205 (Aug. 1975).

Chan et al., "Single-mode and Polarization-independent Silicon-on-insulator waveguides with Small Cross Section," 23 J. Lightwave Tech. 6 (Jun. 2005) pp. 2103-2111.

Chen et al., "Low-loss multimode-interference-based crossings for Silicon Wire Waveguides," 18 IEEE Photonics Letters 21, pp. 2260-2262 (2006).
Chremmos et al., "Properties of Regular Polygons of Coupled Microring Resonators," 46 Applied Optics Optical Society of America 31, pp. 7730-7738 (Nov. 1, 2007).
Chuang, S.L., *Physics of Optoelectronic Devices*, (Wiley, NY, 1995).
Daldosso et al., "Comparison Among Various $Si_3N_4$ Waveguide Geometries Grown within a CMOS Fabrication Pilot Line," 22 J. Lightwave Tech. 7 (Jul. 2004) pp. 1734-1740.
Daldosso et al., "Fabrication and Optical Characterization of thin two-dimensional $Si_3N_4$ Waveguides," Mat. Sci. in Semicond. Proc. 7, (2004) pp. 453-458.
Darmawan et al., "Nested Ring Mach-Zender Interferometer," 15 Optics Express Opt. Soc. America 2, pp. 437-448 (Jan. 2001).
Doerr et al., "Wavelength Add-Drop Node Using Silica Waveguide Integration," 22 J. Lightwave Tech. 12, pp. 2755-2762 (Dec. 2004).
Domash et al., "Tunable and Switchable Multiple-Cavity Thin Film Filters," 22 J. Lightwave Tech. 1, pp. 126-135 (Jan. 2004).
Dumon et al., "Low-loss photonic wires and compact ring resonators in silicon-on-insulator," 5450 Proc. SPIE 1, pp. 360-368 (2004).
Eichenfield et al., "Actuation of Micro-optomechanical Systems via Cavity-enhanced Optical Dipole Forces," 1 Nature Photonics 7, pp. 416-422 (2007).
Espinola et al., "Fast and Low-Power Thermooptic Switch on Thin Silicon-on-Insulator," 15 IEEE Photon. Tech. Lett. 10, pp. 1366-1368 (2003).
Examination Report in European Patent Application No. 04786154.7, mailed Jul. 16, 2008.
Fan et al., "Theoretical Analysis of Channel Drop Tunneling Processes," 59 Phys. Rev. B 2, pp. 15882-15892 (Jun. 15, 1999).
Findakly et al., "On the Crosstalk of Reversed-$\Delta\beta$ Durectional Coupler Switches," 6 J. of Lightwave Tech. 1, pp. 36-40 (Jan. 1988).
Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., Optics Express 15, 17106 (2007).
Green et al., Optics Express 15, 17264 (2007).
Gritsenko et al., "Short-range order in non-stoichiometric amorphous silicon oxynitride and silicon-rich nitride," 297 J. Non-Crystalline Solids 1, pp. 96-101 (Jan. 2002).
Gunn, "CMOS Photonics for High-Speed Interconnects," IEEE Micro 26 (2), pp. 58-66 (Mar./Apr. 2006).
Guo et al., "Characterization of $Si_3N_4/SiO_2$ Planar Lightwave Circuits and Ring Resonators," Proc. of SPIE, vol. 5350 (2004) pp. 13-22.
Guo et al., "High-Q Microring Resonator for Biochemical Sensors," 5728 Proc. SPIE, pp. 83-92 (2005).
Gupta et al., Conf. on Lasers and Electro-Optics (CLEO), p. paper CTuNN5 (2008).
Haus et al., "Broadband Hitless Bypass Switch for Integrated Photonic Circuits," 18 IEEE Photonics Tech. Lett. 10, pp. 1137-1139 (May 15, 2006).
Haus et al., "Elimination of Cross Talk in Optical Directional Couplers," 46 Applied Physics Lett. 1, pp. 1-3 (Jan. 1, 1985).
Haus, H.A. *Waves and Fields in Optoelectronics*, (Prentice-Hall, Englewood Cliffs, NJ, 1984).
Holzwarth et al., "High Speed analog-to-digital conversion with silicon photonics," in Proc. SPIE 7220, 72200B (2009).
In et al., "Origami Fabrication of Nanostructured, Three-dimensional Devices: Electrochemical Capacitors with Carbon Electrodes," Appl. Phys. Lett. 88 (2006) 83104.
International Preliminary Report on Patentability and Written Opinion for PCT/US06/028848, mailed Feb. 7, 2008.
International Preliminary Report on Patentability for PCT/US2007/026513 dated Jul. 9, 2009.
International Preliminary Report on Patentability in International Patent Application No. PCT/US2008/003957, dated Sep. 29, 2009 (11 pages).
International Search Report & Written Opinion for International Patent Application No. PCT/US2007/018207, mailed Jul. 29, 2008 (13 pages).
International Search Report & Written Opinion for PCT/US2005/043762, mailed Jun. 19, 2008, 8 pages.
International Search Report & Written Opinion for PCT/US2007/015740, dated Feb. 18, 2008 (10 pages).
International Search Report & Written Opinion for PCT/US2007/026513, mailed Jun. 19, 2008.
International Search Report & Written Opinion for PCT/US2008/00330, mailed Oct. 14, 2008.
International Search Report & Written Opinion for PCT/US2008/082054, mailed Mar. 18, 2009.
International Search Report & Written Opinion for PCT/US2009/041668, mailed Sep. 11, 2009 (14 pages).
International Search Report & Written Opinion for PCT/US2009/066537, mailed Apr. 16, 2010 (17 pages).
International Search Report and Written Opinion for PCT/US2007/026513 dated Dec. 28, 2007 (15 pages).
International Search Report and Written Opinion for PCT/US2007/026513, dated Dec. 28, 2007 (13 pages).
International Search Report and Written Opinion for PCT/US2008/080749 dated May 25, 2009 (16 pages).
International Search Report and Written Opinion for PCT/US2008/080749 dated May 25, 2009 (19 pages).
International Search Report for PCT/US06/28848, mailed Feb. 16, 2007.
Jackson, J.D., *Classical Electrodynamics* (Wiley, NY, 1999).
Johnson et al., "Perturbation Theory for Maxwell's Equations with Shifting Boundaries," Phys. Rev. E, 65, 066611 (2002).
Kelly et al., "Monolithic Suspended Optical Waveguides for InP MEMS," 16 IEEE Photonics Tech. Letters 5, pp. 1298-1300 (2004).
Khan et al., "Mode-Coupling Analysis of Multipole Symmetric Resonant Add/Drop Filters," 35 IEEE J. of Quantum Elec. 10, pp. 1451-1460 (Oct. 1999).
Khurgin et al., "Expanding the Bandwidth of Slow-Light Photonic Devices Based on Coupled Resonators," 30 Optics Lett. 5, pp. 513-515 (Mar. 1, 2005).
Kippenberg et al., "Analysis of Radiation-pressure Induced Mechanical Oscillation of an Optical Microcavity," Phys. Rev. Lett. 95 (2005) 033901.
Kogelnik et al., "Switched Directional Couplers with Alternating $\Delta\beta$," 12 IEEE J. Quantum Elec. 7, pp. 396-401 (1976).
Korotky, "Three-Space Representation of Phase-Mismatch Switching in Coupled Two-State Optical System," 22 IEEE J. Quantum Elec. 6, pp. 952-958 (1986).
Lee et al., "MEMS-Actuated Microdisk Resonators with Variable Power Coupling Ratios," 17 IEEE Photonics Tech. Lett. 5, pp. 1034-1036 (May 2005).
Lee et al., "Tunable Coupling Regimes of Silicon Microdisk Resonators using MEMS Actuators," 14 Optics Express 11, pp. 4703-4712 (May 29, 2006).
Li et al., Optics Express 16, 13342 (2008).
Little et al., "Filter Synthesis for Periodically Coupled Microring Resonators," 25 Optics Lett. 5, pp. 344-346 (Mar. 1, 2000).
Little et al., "Microring Resonator Channel Dropping Filters," J. Lightwave Tech. 15, pp. 998-1005 (1997).
Little et al., "Very High-order Microring Resonator Filters for WDM Applications," 16 IEEE Photonics Tech. Lett. 10 (Oct. 2004) pp. 2263-2265.
Little et al., "Wavelength Switching and Routing using Absorption and Resonance," 10 IEEE Photonics Tech. Lett. 6, pp. 816-818 (Jun. 1998).
Liu et al., "Low-loss waveguide crossing using a multimode interference structure," 241 Optics Communications 1-3, pp. 99-104 (2004).
Maboudian et al., "Critical Review: Adhesion in Surface Micromechanical Structures," J. Vac. Sci. Tech. B, 15 (1997).
Madsen et al., "A Multi-Port Add/Drop Router using UV-induced Gratings in Planar Waveguides," Lucent Technologies, pp. 104-106.
Madsen et al., "Hitless Reconfigurable Add/Drop Multiplexers using Bragg Gratings in Planar Waveguides," OSA TOPS, v. 29, WDM Components, pp. 54-60.

Madsen et al., *Optical Filter Design and Analysis: A Signal Processing Approach*, (Wiley, NY, 1999).
Madsen, "Efficient Architectures for Exactly Realizing Optical Filters with Optimum Bandpass Designs," 10 IEEE Photonics Tech. Lett. 8, pp. 1136-1138 (Aug. 1998).
Manolatou et al., "Coupling of Modes Analysis of Resonant Channel Add-Drop Filters," 35 IEEE J. of Quantum Elec. 9, pp. 1322-1331 (Sep. 1999).
Manolatou et al., "High-Density Integrated Optics," 17 J. Lightwave Tech. 9, pp. 1682-1692 (Sep. 1999).
McDonald, "Electric and Magnetic Coupling through Small Apertures in Shield Walls of any Thickness," MTT-20 IEEE Trans. On Microwave Theory & Techniques 10, pp. 689-695 (Oct. 1972).
Melchiorri et al., "Propogation Losses of Silicon Nitride Waveguides in the Near Infrared Range," Appl. Phys. Lett. 86, 121111 (2005).
Melloni et al., "Synthesis of Direct-Coupled-Resonators Bandpass Filters for WDM Systems Lightwave Technology," 20 J. Lightwave Tech. 2, pp. 296-303 (2002).
Melloni et al., Integr. Photon. Research and Applications/Nanophotonics (IPNRA), p. paper IMC1 (2006).
Mizrahi et al., "Mirror Manipulation by Attractive and Repulsive Forces of Guided Waves," Opt. Express 13 (2005) pp. 9804-9811.
Mizrahi et al., "Two Slab Optical Spring," Optics Lett. 32 (2007) pp. 692-694.
Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.
Nichols et al., "A Preliminary Communication on the Pressure of Heat and Light Radiation," Phys. Rev. 13 (1901) pp. 307-320.
Nielson et al., "Integrated Wavelength-selective Optical MEMS Switching using Ring Resonator Filters," IEEE Photonics Tech. Lett. 17 (2005) pp. 1190-1192.
Nielson, G.N., "Micro-opto-mechanical Switching and Tuning for Integrated Optical Systems," Ph.D. Thesis, Massachusetts Institute of Technology (2004).
Notomi et al., "Optomechanical Wavelength and Energy Conversion in High-Q Double-layer Cavities of Photonic Crystal Slabs," Phys. Rev. Lett. 97 (2006) 023903.
Oda et al., "A Wide-FSR Waveguide Double-Ring Resonator for Optical FDM Transmission Systems," 9 J. Lightwave Tech. 6, pp. 728-736 (1991).
Okamoto, K., *Fundamentals of Optical Waveguides*, (Elsevier Academic Press, MA, 2006).
Papuchon et al., "Electrically switched Optical Directional Coupler: Cobra," 27 Applied Physics Lett. 5, pp. 289-291 (Sep. 1, 1975).
Partial International Search Report for International Application No. PCT/US2007/018207, mailed Jun. 2, 2008 (5 pages).
Partial International Search Report for International Application No. PCT/US2008/00330, mailed Jul. 30, 2008 (5 pages).
Partial International Search Report for International Application No. PCT/US2008/003957, mailed Jun. 16, 2008 (8 pages).
Partial International Search Report for International Application No. PCT/US2008/080749, mailed Mar. 24, 2009.
Philipp et al., "Amorphous Silicon Rich Silicon Nitride Optical Waveguides for High Density Integrated Optics," 40 IEEE Electronics Letters 7, pp. 419-420. (Apr. 2004).
Poon et al., "Wavelength-selective reflector based on a circular array of coupled microring resonators," 16 IEEE Photonics Technology Letters 5, pp. 1331-1333 (May 2004).
Popovic et al., "General Approach to Hitless Switching and FSR Extension Resonators in Integrated Photonic Circuits," (2006) Paper OW166.
Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.
Popovic et al., "Multistage High-Order Microring-Resonator add-drop Filters," 31 Optics Lett. 17 (Sep. 2006) pp. 2571-2573.
Popovic et al., Optics Express 14, 1208 (2006).
Popovic, "Air Trenches for Dense Silica Integrated Optics," MS Thesis, Massachusetts Institute of Technology, Dept. of Electrical Engineering & Computer Science, Feb. 2002, p. 53.
Popovic, "Optimally efficient resonance-tuned optical modulators," in CLEO 2009, paper CTuV6 (2 pages) (May 2009).
Popovic, Resonant optical modulators beyond conventional energy-efficiency and modulation frequency limitations.
Popovic, "Resonant-cavity modulators beyond the bandwidth-sensitivity limit, approaching the limit of efficiency" (non-published).
Popovic, M., "Complex-frequency Leaky Mode Computations using PML Boundary Layers for Dielectric Resonant Structures," Proc. of Integ. Photonics Res. (Jun. 2003).
Povinelli et al., "Enhancement mechanisms for optical forces in integrated optics," 6326 Proc. of SPIE Optical Trapping & Optical Manip. III 15, (2006).
Povinelli et al., "Evanescent-wave Bonding Between Optical Waveguides," Optical Lett. 30 (2005) pp. 3042-3044.
Povinelli et al., "High-Q Enhancement of Attractive and Repulsive Optical Forces between Coupled Whispering-gallery-mode Resonators," Opt. Express 13 (2005) pp. 8286-8295.
Qi et al., "A Three-dimensional Optical Photonic Crystal with Designed Point Defects," Nature 429 (2004) pp. 538-542.
Rabiei et al., "Polymer Micro-Ring Filters and Modulators," J. Lightwave Tech. 20, 1968 (2002).
Rakich et al., "Achieving Centimeter-scale supercollimation in a Large-area Two-dimensional Photonic Crystal," Nature Materials 5 (2006) pp. 93-96.
Rakich et al., "Cavity-Trapping via Optical-forces in Integrated Photonics," Massachusetts Institute of Technology.
Rakich et al., "Trapping, corraling and spectral bonding of optical resonances through optically induced potentials," 1 Nature Photonics 11, pp. 658-665 (2007).
Rakich et al., "Ultrawide Tuning of Photonic Microcavities via Evanescent Field Perturbation," Optics Lett. 31 (2006) pp. 1241-1243.
Rezzonico et al., Optics Express 16, 613 (2008).
Rhodes, "A Low-Pass Filter Prototype Network for Microwave Linear Phase Filters," MTT-18 IEEE Trans. Microwave Theory Tech. 6, pp. 290-301 (Jun. 1970).
Sacher et al., Optics Express 16, 15741 (2008).
Sarid, D., *Scanning Force Microscopy with Applications to Electric, Magnetic, and Atomi Forces*, (Oxford University Press, NY, 1994).
Saynatjoki et al., "High-index-contrast Optical Waveguides on Silicon," 2 pages.
Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (1998).
Song et al., "Ultra-high-Q Photonic Double-heterostructure Nanocavity," Nature Materials 4 (2005) pp. 207-210.
Spector et al., "Hybrid multi-mode/single-mode Waveguides for Low Loss," Massachusetts Institute of Technology, 3 pages.
Srinivasan et al., "Alkyltrichlorosilane-based Self-assembled Monolayer Films for Stiction Reduction in Silicon Micromachines," J. of Microelectromechanical Sys. 7 (1998) pp. 252-260.
Sugimoto et al., "Waveguide polarization-independent Optical Circulator," 11 IEEE Photon. Tech. Lett. 3, pp. 355-357 (Mar. 1999).
Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).
Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).
Tang et al., Highly efficient optical phase modulator in SOI waveguides, 31 Electronics Letters 6, pp. 451-452 (1995).
Tormen, "Passive Optical Integrated Components for Telecommunication," Universite De Nice-Sophia Antipolis (2003) 196 pages.
Van Spengen et al., "A Physical Model to Predict Stiction in MEMS," J. of Micromechanics & Microengineering 12 (2002) pp. 702-713.
Watts et al., "Maximally Confined Silicon Microphotonic Modulators and Switches," IEEE Proc. of the LEOS Ann. Meet., p paper WF1, pp. 457-458 (2008).
Weber et al., "Crosstalk and Switching Characteristics in Directional Couplers," 24 IEEE J. of Quantum Elect. 3, pp. 537-548 (Mar. 1988).

Wei et al., "Compound Ring Resonator with Double Couplers," 186 Optics Communications 4-6, pp. 283-290 (Dec. 15, 2000).

Williamson, "Sensitivity-bandwidth product for electro-optic modulators," Optics Letters 26, 1362 (2001).

Xu et al., "Experimental Realization of an on-Chip All-Optical Analogue to Electromagnetically Induced Transparency," Phys. Rev. Lett. 96, pp. 1-4 (2006).

Xu et al., "Micrometre-scale silicon electro-optic modulator," Nature, vol. 435, pp. 325-327 (2005).

Yanagase et al., "Box-Like Filter Response and Expansion of FSR by a Vertically Triple Coupled Microring Resonator Filter," 20 J. Lightwave Tech. 8, pp. 1525-1529 (2002).

Yanik et al., "Stopping Light All Optically," 92 Phy. Rev. Lett. 8, pp. 1-4 (Feb. 27, 2004).

Yariv et al., "Coupled-Resonator Optical Waveguide: a Proposal and Analysis," 24 Optics Lett. 11, pp. 711-713 (Jun. 1, 1999).

DeVaux et al., "High-speed tandem of MQW modulators for coded pulse generation with 14-DB fiber-to-fiber gain," 8 IEEE Photonics Tech. Lett. 2, pp. 218-220 (Feb. 1996).

International Search Report & Written Opinion for PCT/US2010/036630, mailed Sep. 15, 2010, 12 pages.

Kyle et al., "High-Speed all-optical modulation using polycrystalline silicon microring resonators," 92 Appl. Phys. Lett. 15 (Apr. 15, 2008).

International Preliminary Report on Patentability for PCT/US2009/041668, mailed Nov. 11, 2010 (7 pages).

Popovic, "Theory and Design of High-Index-Contrast Microphotonic Circuits," Ph.D. Thesis, Massachusetts Institute of Technology, Dept. of Electrical Engineering & Computer Science, Feb. 2008.

* cited by examiner

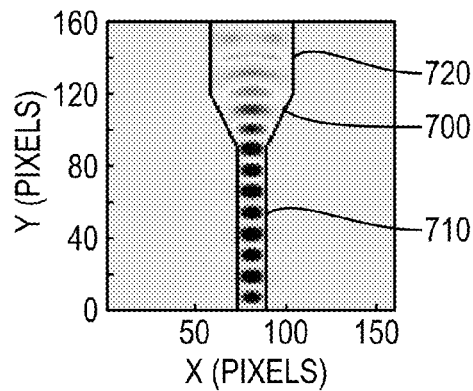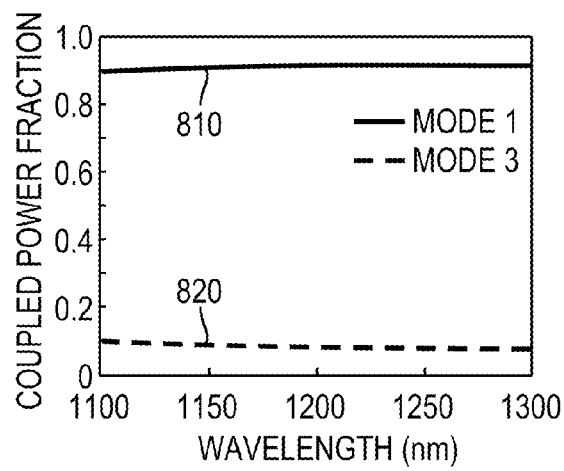
FIG. 9A
FIG. 9B
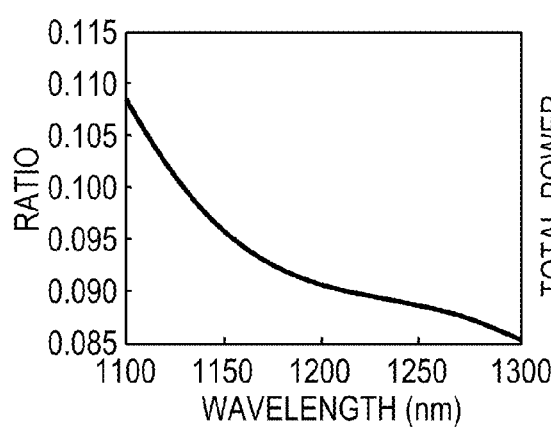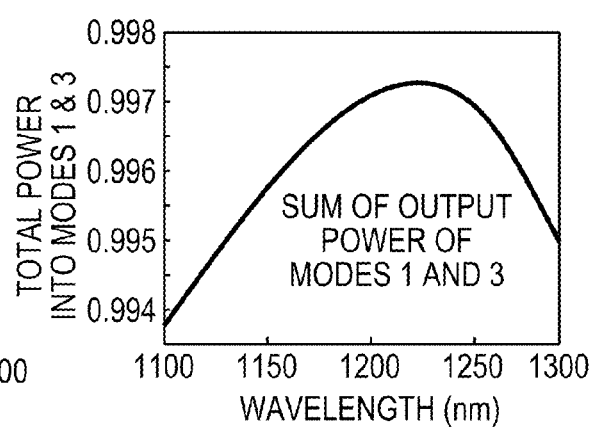
FIG. 9C
FIG. 9D

US 8,116,603 B2

LOW-LOSS BLOCH WAVE GUIDING IN OPEN STRUCTURES AND HIGHLY COMPACT EFFICIENT WAVEGUIDE-CROSSING ARRAYS

CROSS-REFERENCE TO RELATED APPLICATION

This application is a divisional application of U.S. patent application Ser. No. 12/288,716, filed Oct. 22, 2008, which claims priority to and the benefit of U.S. Provisional Application Ser. No. 60/981,597, filed on Oct. 22, 2007; the entire disclosures of both of these applications are hereby incorporated by reference.

GOVERNMENT RIGHTS

This invention was made with government support under Grant No. W911NF-06-1-0449 awarded by the Army Research Office. The government has certain rights in this invention.

FIELD OF THE INVENTION

The present invention relates generally to microphotonic structures and, more particularly, to compact microphotonic structures including waveguide attachments.

BACKGROUND

Strong-confinement (SC) waveguides based on high-index contrast support dense photonic device integration, promising complex microphotonic circuits such as on-chip wavelength multiplexers or entire photonic networks on a microprocessor die. As device density and complexity increase in a planar photonic circuit, efficient waveguide crossings quickly become of paramount importance because the number of waveguide crossings required rises quickly, and tolerable levels of loss and crosstalk per crossing accordingly drop to very small limits.

Straightforward crossing of single-mode SC waveguides leads to strong diffraction losses, and a number of improvements have been proposed. Low-Q resonator-based silicon waveguide crossings provide, in theory, ~0.2 dB loss, but have limited low-loss bandwidths (typically in the range of 10-15 nm), challenging critical dimensions, and fabrication sensitivities. On the other hand, waveguide crossings using mode expanders to widen the effective aperture and reduce diffraction losses are broadband and tolerant, but are typically large or not optimally efficient, giving a loss on the order of 0.4 dB, both in theory and practice, or a loss of 0.2 dB with a multi-layer structure. To reduce diffraction losses, multimode interference-based crossings that mimic focusing have been investigated, but although they are more compact in size, their predicted losses remain on the order of 0.2 dB per crossing. While such losses may seem small, they may not be acceptable in dense circuits where one may thus accumulate about 10-20 dB of loss after 50 crossings. It is therefore desirable to develop designs for waveguide crossings, suitable for on-chip integration, that have lower losses than currently possible, and that permit the cascading of tens or hundreds of crossings, as is typical in dense integrated photonic circuits, with tolerable insertion loss.

Problems associated with waveguide crossings and junctions are not limited to intersecting waveguides, but similarly occur in optical modulator structures. The confinement of light in waveguide cross sections and resonator volumes on the scale of a few optical wavelengths (squared or cubed, respectively) enables strong light-matter interaction that may be utilized in energy-efficient, compact-footprint electro-optic modulators, as illustrated in FIG. 1. See Xu et al., Nature (2005). Such modulators 100 may be based, for example, on microring resonators 110 formed of a semiconductor waveguide core 120, e.g., of silicon. The waveguide has a ridge-like cross-section 122 due to lateral sections 130 ("flanges") of p-type doped and n-type doped silicon attached to both sides of the waveguide core 120. These lateral sections 130 are optically isolated from, but in electrical contact with, the waveguide core 120. Together with the intrinsic-semiconductor core 120 between them, they form a p-i-n junction that may be electrically driven to inject electric charge carriers into the waveguide region 122 containing the confined optical field. Charge injection from an electric power supply 124 into the "i" (intrinsic-semiconductor) region, i.e., the waveguide core 120, causes modulation of the material refractive index at optical (e.g., 1550 nm infrared) wavelengths due to the plasma dispersion effect.

Electro-optic modulators such as structure 100 enable high-efficiency communication links for telecom applications as well as for on-chip photonic networks for microprocessors, including interconnects for multi-core processors. However, they may have a disadvantageous design trade-off. In a shallow-etch ridge waveguide, the mode may be weakly confined laterally in the waveguide, and the bending radiation loss is typically large for small radii. Hence, large radius ring resonators 110 are preferably used to achieve low loss and a high quality factor (Q), leading to lower energy efficiency (due to a larger volume of confinement for the optical mode) as well as larger devices (due to the lager radius). In addition, as a consequence of weak optical confinement, the doped regions are typically laterally far from the waveguide core, increasing series resistance. On the other hand, if a deep-etch ridge waveguide is used, the lateral flanges 130 are usually thin, providing reasonably strong confinement, and enabling the doped regions to be placed closer to the waveguide core 120, without having large overlap with the optical mode that would incur large optical losses. However, the thin flanges increase series resistance between the electrical contacts, leading to lower energy efficiency. It is desirable to provide modulator designs, including resonator designs, that have both low resistance between the electrical contacts through the intrinsic region and confinement of the optical mode, enabling small waveguide cross sections and resonator volumes without large optical overlap.

Furthermore, multimode resonators such as circular disk resonators are known to support low bending losses (in comparison to single-mode microring resonators of comparable radius), but to suffer coupling inefficiencies when coupling to an input waveguide because multiple disk modes may be excited, whereas only a single excited resonant mode is of interest. This problem is also known to occur in multimode ring resonators, or single-mode microring resonators very near the cut-off condition for higher-order modes. Single-mode microring resonators with waveguide cross-sectional dimensions that are well within (smaller than) the cutoff-condition dimensions for higher-order modes support efficient waveguide-resonator couplers with low scattering losses. However, their bending loss is higher than that of disk resonators of comparable radius that have low-bending-loss whispering-gallery modes. It is, therefore, desirable to provide alternative resonator designs that allow efficient coupling and strong confinement.

Generally, the problems described above are related to excess loss in SC optical waveguide and resonator devices due to interaction of functional parts of a device with the optical field in the device. This interaction may cause optical loss because the functional parts are optical scattering dielectric objects or absorptive (doped-semiconductor) material regions having contact with the optical field in the device. It would be of advantage to devise device designs that can strategically place these functional parts outside the reach of the optical field, without compromising their original function or the efficiency of the design for that function (e.g., to serve as a crossing, modulation region, or waveguide-resonator coupling region).

SUMMARY

Embodiments of the invention include integrated optical devices that advantageously employ multimode behavior in strongly confining photonic structures, while mitigating the concomitant disadvantages typically associated with multimode designs. In particular, embodiments of the invention include low-loss optical waveguide crossing arrays, optical modulators, and optical resonators and resonant modulators. In addition, optical structures supporting the foregoing devices, including asymmetric and wavelength-flattened mode excitation tapers, are provided. The optical devices of embodiments of the present invention generally support an engineered optical intensity pattern in the waveguide or resonator, achieved through judicious excitation of multimode and single-mode sections, in order to support low optical intensities in those areas where scattering structures or absorptive materials would otherwise incur optical loss.

Various embodiments of the invention enable attachments to be disposed at the core of a waveguide without causing substantial optical losses in the waveguide through conversion to unwanted guided or radiative modes. Such structures employ multimode optical designs with a periodic light intensity pattern having a periodicity matched to a periodicity of the structure. The intensity pattern produces periodic low-intensity or nearly intensity-free regions at the waveguide core edges. Crossing structures, such as, e.g., crossing waveguides, are attached at and/or near the sidewalls at any of the positions along the primary waveguide where the periodic low optical intensity occurs. Because the addition of the attachments affects the periodicity of the optical intensity pattern, the structure is preferably designed as a unit, and when period matching is achieved between the structure and the optical field pattern, a low-loss Bloch wave is supported in the structure. Efficiently exciting this mode allows for ultra-low-loss waveguide crossing arrays.

In an aspect, embodiments of the invention include an optical structure having a multi-mode waveguide and a plurality of attachments disposed along one side of the core of the waveguide. The waveguide supports a first mode and a second mode, whose simultaneous excitation creates a periodic light intensity pattern including low-intensity regions in the core. Each attachment is located adjacent such a low-intensity region, but not adjacent a high-intensity region. The attachments may include transverse waveguide sections and/or doped semiconductor sections. The optical structure may further include a single-mode waveguide, and a tapered waveguide section connecting the multi-mode waveguide to the single-mode waveguide. In certain embodiments, the length of the tapered waveguide section is smaller than a period of the periodic light intensity pattern.

One or more of the following features may be included. The optical structure may have a second plurality of attachments disposed at the core of the multimode waveguide, each attachment of the second plurality being located substantially opposite an attachment of the first plurality. Some or all of the attachments may be, or include, waveguide sections. The two modes generating the periodic light intensity pattern may have the same lateral symmetry in a cross-section of the multimode waveguide with respect to the center of the cross-section. For example, the first mode may be a fundamental mode, and the second mode may be a third-order mode of the multimode waveguide. In certain embodiments, a width of the multimode waveguide is about five-sixths of a free-space wavelength of the first mode, and a period of the periodic light intensity pattern is about twice the free-space wavelength of the first mode.

The optical structure may include a second plurality of attachments disposed along a second side of the waveguide core, each attachment being located adjacent a low-intensity region and between two adjacent attachments of the first plurality. For example, the attachments of the first plurality may be substantially periodically spaced, and some or all of the attachments of the second plurality may each be placed midway between two adjacent attachments of the first plurality. Some of the attachments may include doped semiconductor sections. For example, at least some of the attachments of the first plurality may be doped with a first (e.g., positive) type of dopant, and at least some of the attachments of the second plurality may be doped with a second (e.g., negative) type of dopant. Upon application of a voltage, the doped attachments of the first and second pluralities include an electrical current in the waveguide core. In some embodiments, the two modes generating the periodic light intensity pattern may have opposite lateral symmetry in a waveguide cross-section with respect to the center of the waveguide cross-section. For example, the two modes may be a fundamental mode and a second-order mode of the multi-mode waveguide.

The multi-mode waveguide may be curved. In certain embodiments, it may form a closed-loop resonator. A second plurality of attachments may be disposed on a second side of the curved multi-mode waveguide, each attachment of the second plurality being located adjacent a low-intensity region of the periodic light intensity pattern and between two adjacent attachments of the first plurality of attachments. For example, the attachments of the first plurality may be disposed along the inner side of the multi-mode waveguide, pointing inwards, and the attachments of the second plurality may point outwards. Some or all of the attachments may contain doped semiconductor regions.

In another aspect, embodiments of the invention provide an optical waveguide structure for distributing power between modes of a multi-mode waveguide. The optical waveguide structure includes, in various embodiments, a first waveguide supporting at least one mode; a second waveguide supporting at least two modes; and a tapered waveguide section asymmetric around a longitudinal axis connecting the first waveguide to the second waveguide. The core cross-section of the first waveguide is different from that of the second waveguide, and the core cross-section of the tapered waveguide section matches on each end the core cross-section of the waveguide to which it is connected. A central axis of the first waveguide is shifted laterally with respect to a central axis of the second waveguide, consistent with the asymmetry of the tapered waveguide section connecting the two.

In yet another aspect, embodiments of the invention provide another optical waveguide structure for distributing power between modes of a multi-mode waveguide. In various embodiments, this structure includes a first waveguide supporting at least one mode; a second waveguide supporting at least two modes; a third waveguide supporting at least two modes; and two tapered waveguide sections connecting the first to the second waveguide and the second to the third waveguide. The core cross-section of the second waveguide differs from the core cross-sections of both the first and the third waveguide. The tapered waveguide sections have core cross-sections matching at each end the core cross-section of the waveguide to which they are connected. The lengths of the tapered waveguide sections and the second waveguide are chosen such that they cooperate to cause a desired wavelength-dependent distribution of power from a mode in the first waveguide to two modes in the third waveguide.

In another aspect, embodiments of the invention provide a method for low-loss guiding of light waves. In various embodiments, the method involves providing an optical structure having (i) a multi-mode waveguide supporting two modes that create a periodic light intensity pattern with low-intensity regions, and (ii) a plurality of attachments disposed on the multi-mode waveguide adjacent the low-intensity regions, as described above, and exciting the two modes in the multi-mode waveguide so as to guide light waves with low loss. In some embodiments, the loss does not exceed 0.05 dB per attachment. The description of elements and features of embodiments of aspects directed to optical structures may be applied to the method as well.

In yet another aspect, the invention provides, in various embodiments, an optical structure including a waveguide and an optical resonator. The optical resonator includes a multi-mode waveguide section, and a single-mode waveguide section coupled to at least one end of the multimode waveguide section. For example, the single-mode waveguide section may connect one end of the multi-mode waveguide section to the other, thus forming a closed loop resonator. Alternatively, additional waveguide sections may connect the free ends of the single-mode and the multimode waveguide section. The optical resonator is coupled to the waveguide through a coupling region contained in the single-mode waveguide section. In some embodiments, the optical structure further includes one or more attachments disposed on the multimode waveguide, which include a region of positively doped semiconductor material and a region of negatively doped semiconductor material. For instance, one attachment, connected to the side of the multimode waveguide in two locations may contain both doped regions, or two attachments may contain each one of the doped regions. The optical structure may further include a transition region coupled to the single-mode waveguide section on one side and the multimode waveguide section on the other side. The transition region may contain a tapered waveguide section.

BRIEF DESCRIPTION OF THE DRAWINGS

The foregoing discussion will be understood more readily from the following detailed description of the invention when taken in conjunction with the accompanying drawings.

FIG. 9A is an illustration of the simulated light pattern inside a single-mode and a multimode waveguide coupled by a tapered waveguide section in accordance with some embodiments of the invention.

FIGS. 9B-9D are graphs of the power fractions coupled into the first and third modes of the multimode waveguide of FIG. 9A, the ratio of these fractions, and the fraction of the total input power coupled into the multimode waveguide, respectively.

DETAILED DESCRIPTION

Figure 1:
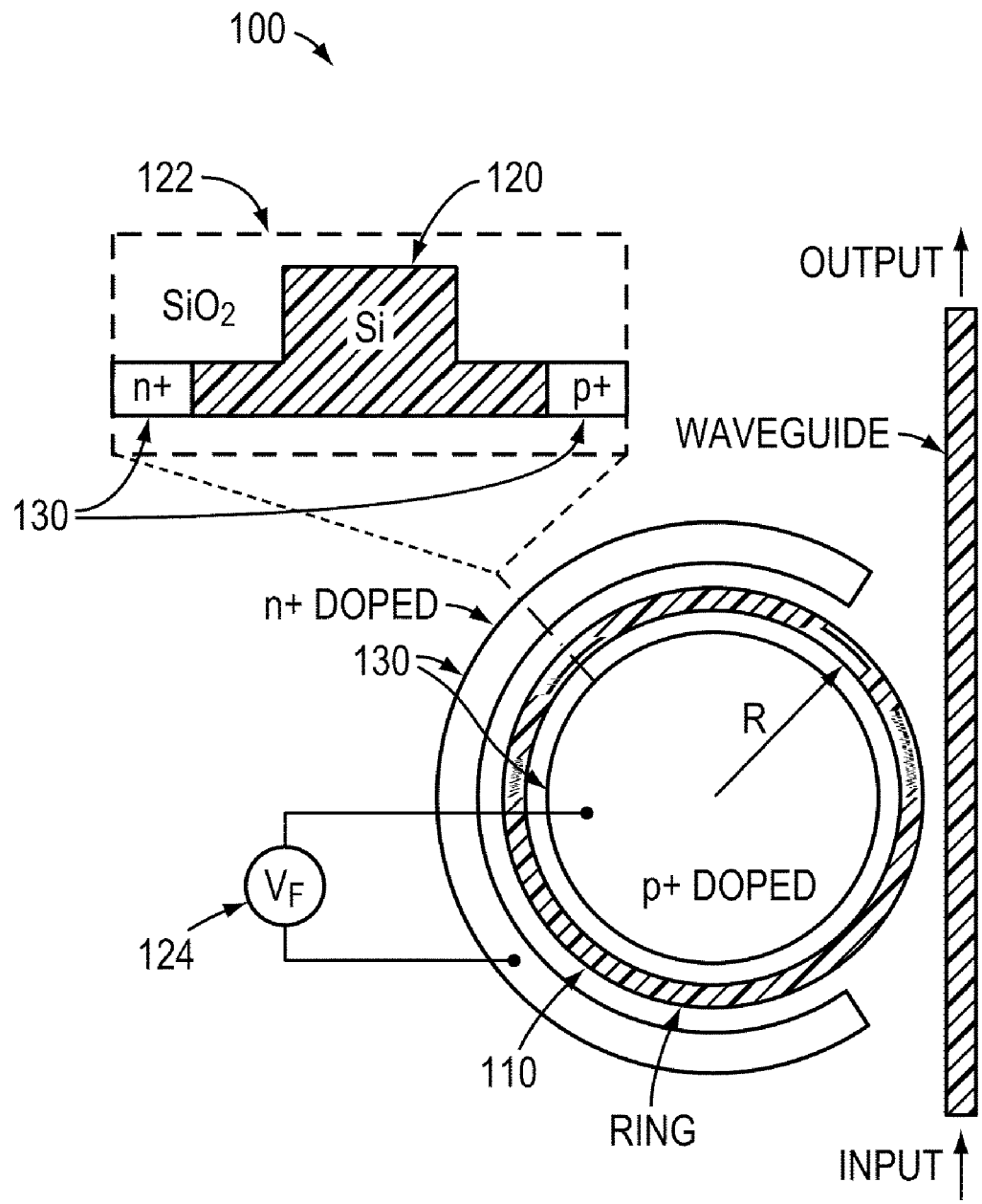
FIG. 1 is a schematic diagram illustrating a microring-resonator-based optical modulator.

Various embodiments of the present invention provide different integrated photonic device designs that enable shaping of an optical intensity pattern in a waveguide or resonator to permit certain elements (attachment structures or absorptive material regions) to be placed in regions of relatively low optical intensity. The placement of these elements confers design advantages, such as permitting crossing paths of optical propagation (waveguide crossings), and enabling efficient modulation by permitting low resistance between the electrical contacts of a p-i-n diode that may be included in the optical structure.

High-index-contrast dielectric waveguides in general support modes with hybrid polarization, which may have a major and minor transverse polarization field, and not necessarily pure TE and TM modes. However, the waveguides considered here typically support modes of interest that are TE-like and TM-like. The nomenclature is simplified herein to TE and TM.

Waveguide structures in accordance with various embodiments of the invention may be made from a variety of core and cladding materials providing high index contrast, i.e., from any combination of materials for which the ratio of the core index to the cladding index is at least 1.2, and with a variety of core cross-sections. Various aspects and concepts of embodiments of the invention are illustrated herein with the example of a waveguides with a silicon core of rectangular cross-section and a uniform dielectric silica cladding. However, the general principles underlying embodiments of the invention hold for a range of waveguide designs, as long as they are strongly confining, i.e., confine the optical mode in a cross-section that is on the order of a wavelength in dimension or smaller.

Referring to FIG. 2, in various embodiments of the invention, photonic structures generate and support a laterally confined optical field pattern 200 that propagates along a path of propagation 210. The width of the field pattern, defined between half-intensity envelopes 220, and the lateral position 230 of the field pattern, may vary along the path of propagation. The width and lateral position 230 of the field pattern 200 at any point along the propagation path 210 may be defined along a cross-section 240 perpendicular to the path of propagation 210. The lateral position 230 may be defined as the "center of mass" of the intensity distribution along the cross-section, so that the integrated optical power flow to the left of the lateral position 230 is equal to that to the right of it. Likewise, the width of the optical field pattern at a point may be defined as the distance between the points of half intensity 220 relative to the peak intensity along the cross-section. Various other similar definitions of width and lateral position (e.g., as the point of maximum intensity) may be applied without affecting the validity of the description. Preferably, the variation of the width and/or lateral position 230 along the propagation path 210 is periodic.

Figure 2A:
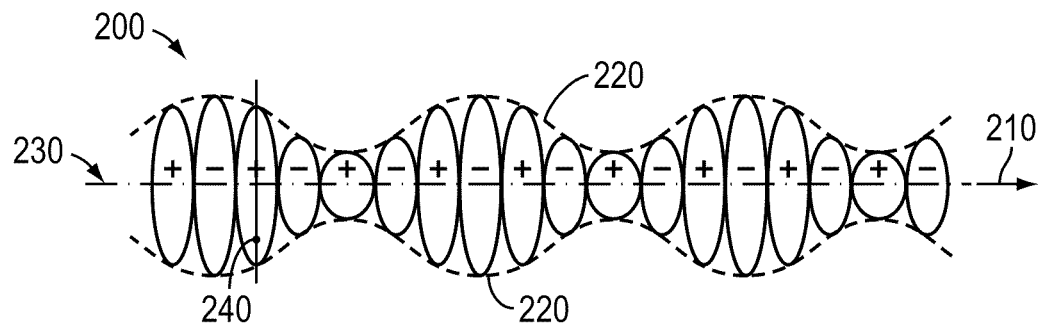
FIGS. 2A-2C are schematic diagrams illustrating periodically varying light intensity patterns in accordance with various embodiments of the invention.

In an embodiment, the optical field pattern 200 may have a varying width along the propagation path 210, as illustrated in FIG. 2A. Exemplary embodiments of this configuration are illustrated in FIGS. 5A-5C and 13A-13C.

Figure 2B:
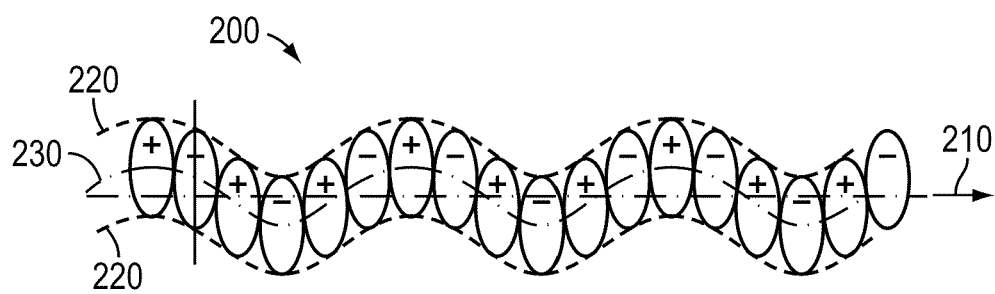
Figure 2C:
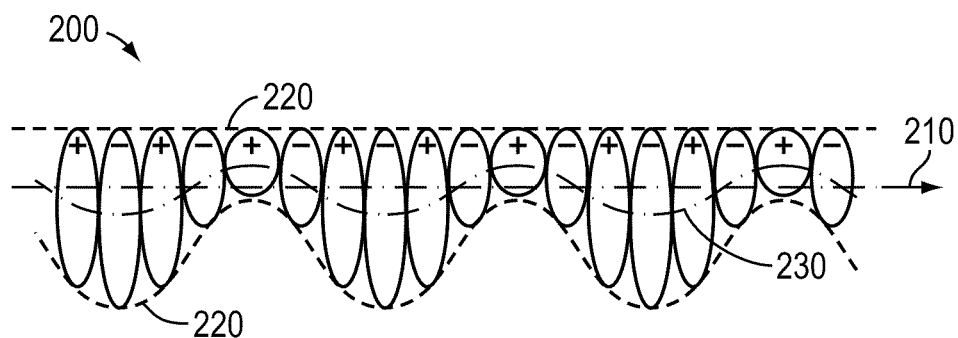
Figure 15:
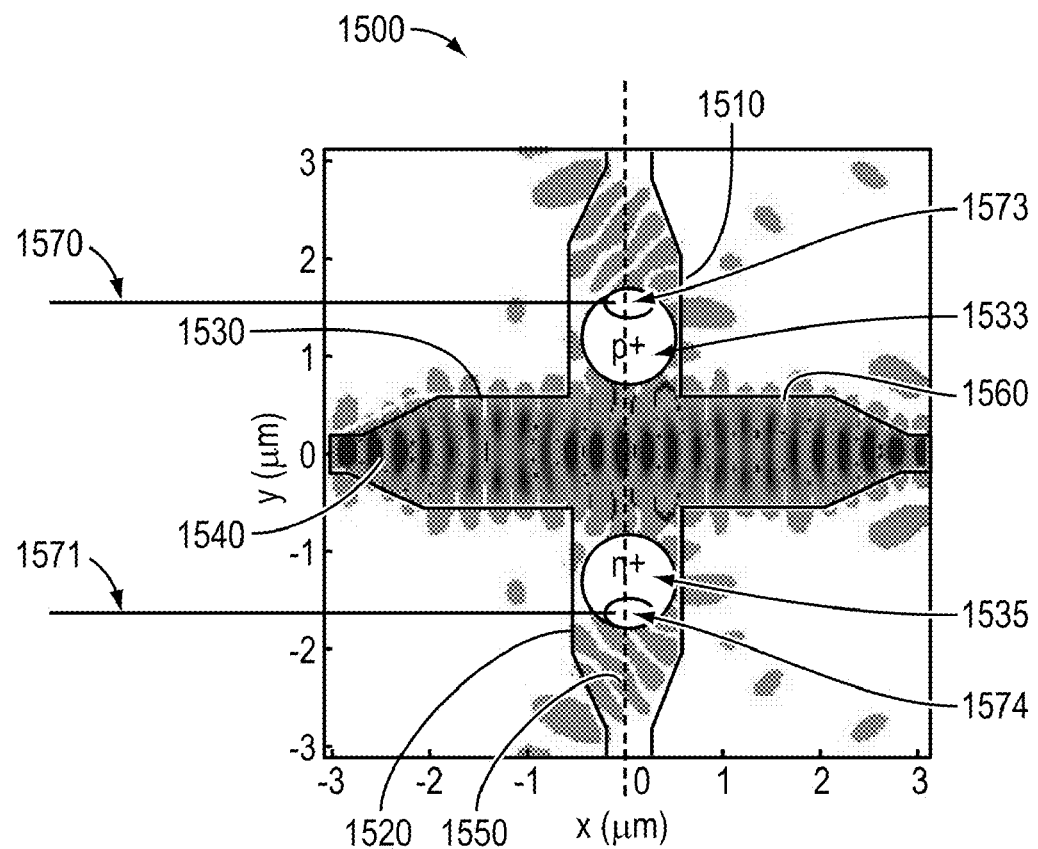
FIG. 15 is a schematic diagram of a multimode waveguide with doped semiconductor attachments in accordance with some embodiments of the invention.

In another embodiment, the optical field pattern 200 may have a varying lateral position 230 along the propagation path 210, as illustrated in FIG. 2B. An exemplary embodiment is illustrated in FIG. 15. The optical field pattern 200 may also exhibit a combination of the two, namely a varying width and lateral position 230, as illustrated in FIG. 2C.

Figure 3A:
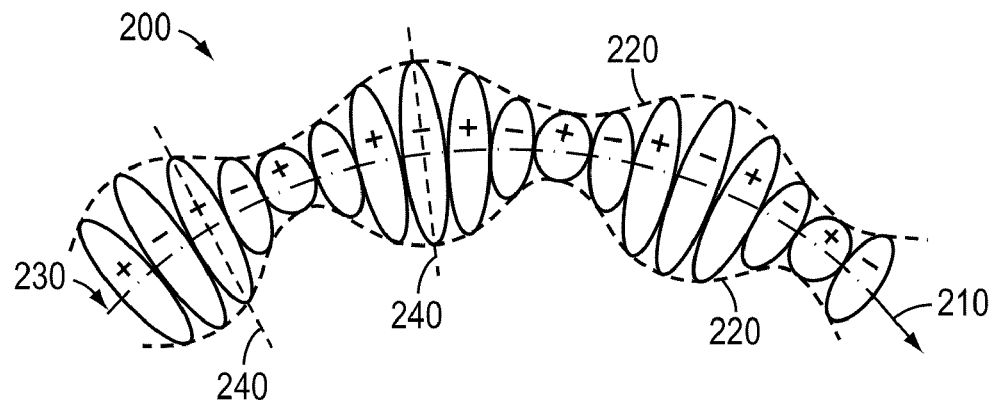
FIGS. 3A and 3B are schematic diagrams illustrating periodically varying light intensity patterns along curved propagation paths in accordance with various embodiments of the invention.
Figure 3B:
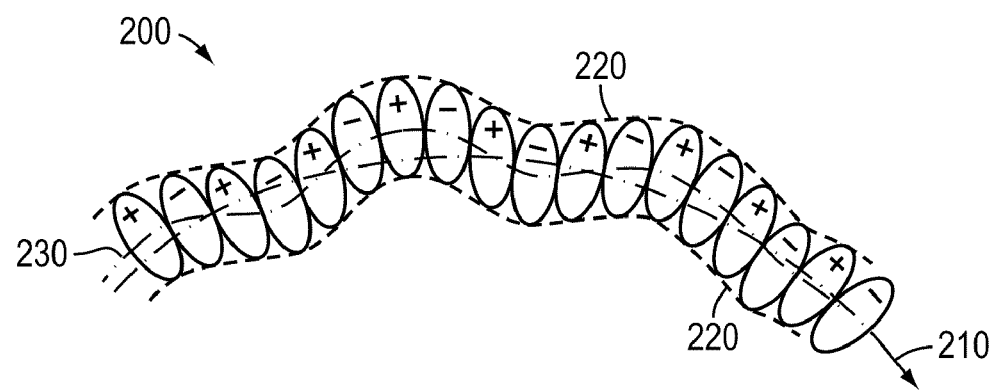
Figure 20A:
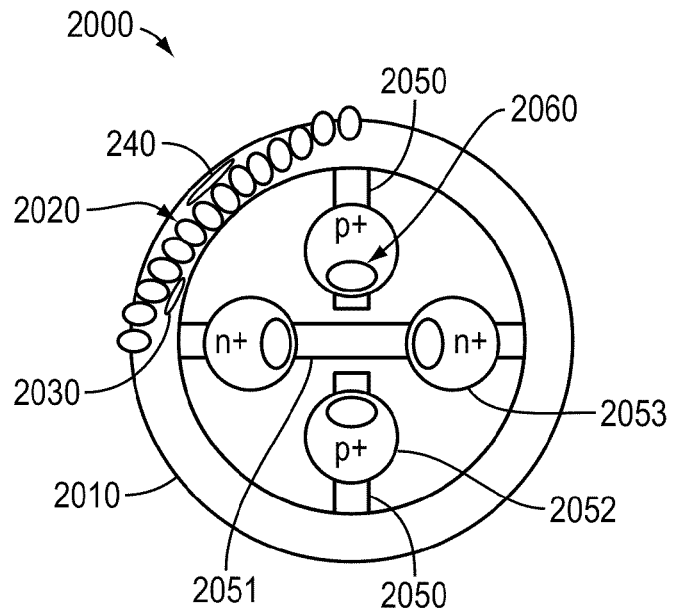
FIGS. 20A and 20B are schematic diagrams of resonant optical modulators in accordance with various embodiments of the invention.
Figure 20B:
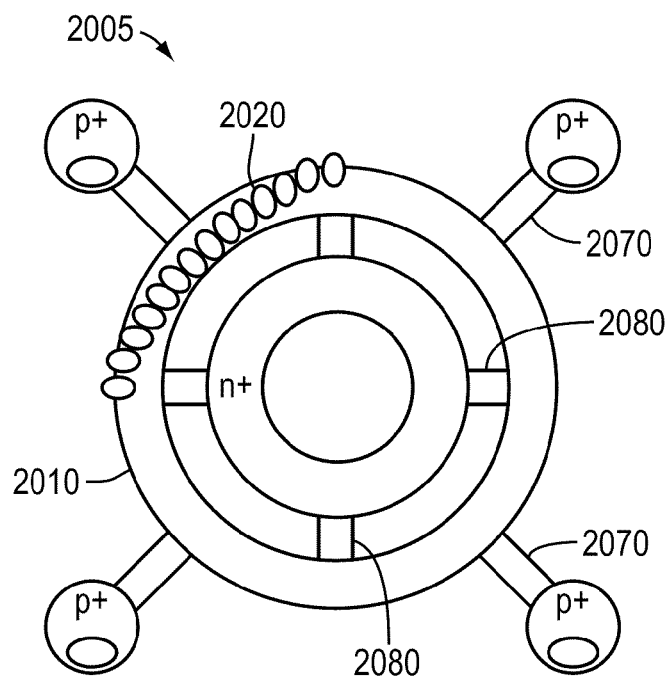

In yet another embodiment, the propagation path 210 may not be straight but may be curved, as illustrated in FIG. 3A (varying width) and FIG. 3B (varying lateral position 230). Exemplary embodiments of this configuration are illustrated in FIGS. 20A and 20B.

Figure 4A:
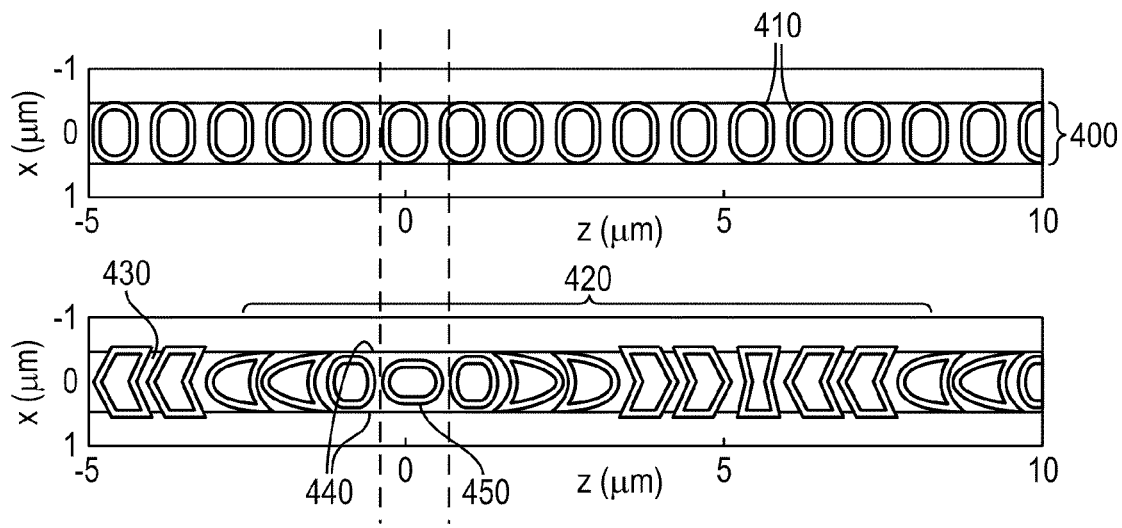
FIG. 4A is an illustration of two simulated light patterns inside a waveguide in accordance with some embodiments of the invention.

A laterally confined optical field pattern 200 with a variable width and/or lateral position 230 may be formed by the excitation of multiple modes of a guided-wave structure in an appropriate ratio. In FIG. 4A, an exemplary waveguide core 400 of width 1 µm, core index of 3.5 (e.g., of silicon) and cladding index of 1.45 (e.g., of silica, i.e., $SiO_2$) supports three guided modes at a wavelength of 1550 nm. When the fundamental mode 410 is excited, the width and lateral position of the intensity pattern are constant along the propagation path, but when two modes (the first and third mode in the illustrated case) are excited, the width of the intensity pattern varies periodically with a "beat" period 420, $L_{beat}$ defined by $$(\beta_1 - \beta_2) L_{beat} = 2\pi \qquad (1)$$

where $\beta_1$ is the larger and $\beta_2$ is the smaller of the propagation constants of the two modes. In this example, $L_{beat}$ is about 10 µm. The simulation in FIG. 4A is two-dimensional and employs an out-of-plane (TM) polarization, but the general principle applies to realistic 3D situations with slight modifications of dimensions.

More generally, in structures that are more complex than a straight waveguide of uniform width, the propagation constants of the modes may not be constant along the length, and the condition in equation (1) may be more generally interpreted as stating that the intensity pattern repeats after a propagation distance for which the modes accumulate a total relative phase shift of $2\pi$ (or a multiple). More generally, this holds true when more than two modes are excited, and optical structures that support such repeating patterns exist. These patterns, in the more general sense, are referred to herein as envelope Bloch waves.

FIG. 4A (bottom) shows the field amplitude pattern for relative field amplitudes of 1.0 and 0.3 in the first and third modes. At this amplitude ratio, a periodic "breathing" field pattern 430 is formed that varies in width between a minimum and a maximum, simulating periodic focusing. While the excitation of a single mode results in a concentration of most of the light in the core of the waveguide, and significantly lower intensity in the cladding, the simultaneous excitation of the first and third modes causes regions of low intensity 440 to occur even in the core, at a period of $L_{beat}$. These low-intensity regions appear to the sides of the minimum-width regions 450 (the "foci") of the light intensity pattern 430. As used herein, low-intensity regions are defined as regions in which the light intensity has dropped below one-half of the peak intensity of the light intensity pattern 430.

Figure 4B:
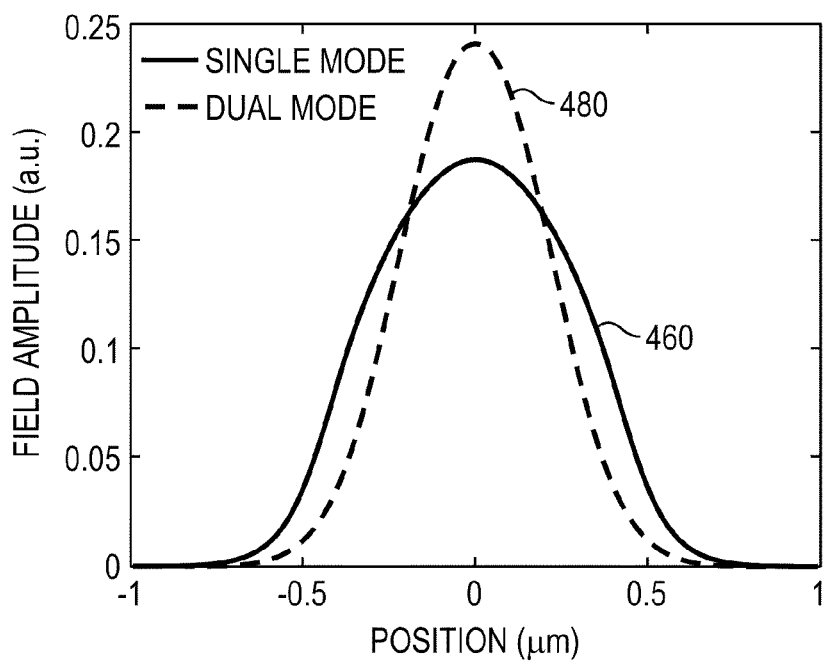
FIG. 4B is a graph of a cross sectional intensity of the simulated light patterns of FIG. 4A.

The relative field amplitudes may be selected to reduce the width of the minimum-width region, increasing the size of the low-intensity regions 440 in the core, and reducing the residual light intensity in these regions 440. FIG. 4B compares the total field amplitudes 460, 480 of the single-mode excitation (460) and the two-mode excitation (480) at the minimum-width point along the propagation path in cross-section. At the lateral position of the sidewalls of the waveguide core (i.e., at ±0.5 µm in FIG. 4B), the field intensity, i.e., the square of the field amplitude, is about 16 times smaller in the dual-mode excitation than it is in the single-mode excitation. Smaller field intensity on the sidewalls translates to smaller scattering losses from sidewall roughness as well as smaller scattering from imperfections, objects, and abrupt geometry changes near the sidewalls. As a result, the field pattern in FIG. 4A (bottom) is well-suited for high-efficiency waveguide-crossing arrays.

Figure 5A:
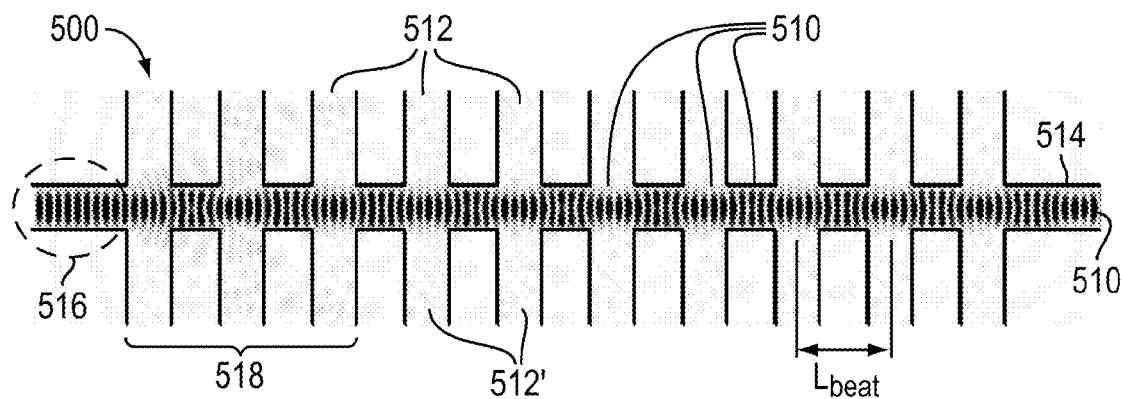
FIGS. 5A-5C are illustrations of the amplitude, intensity, and intensity multiplied by 100, respectively, of a simulated light pattern in a matched periodic crossing waveguide structure in accordance with some embodiments of the invention.
Figure 5B:
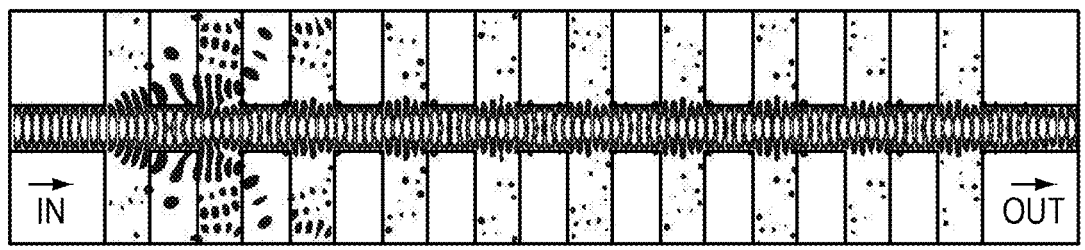
Figure 5C:
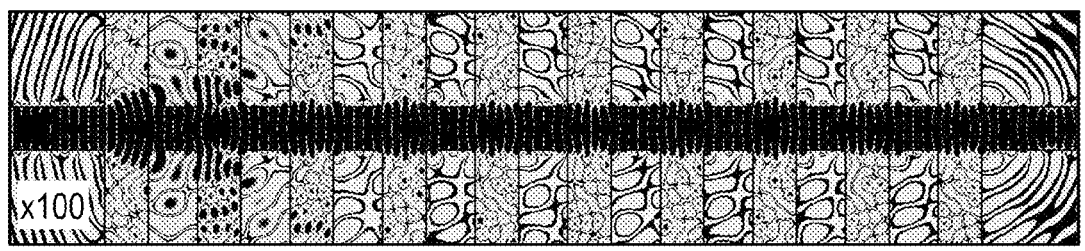

FIGS. 5A-5C illustrate an exemplary embodiment of an optical structure 500 that utilizes a periodic light intensity pattern 510 created by the excitation of a first mode and a second mode in a multimode waveguide. The first mode may be a first-order, or fundamental, mode, and the second mode may be a third-order mode. As explained above for FIG. 4A, such a pattern 510 includes lateral positions at which the light is "focused" into an inner region of the waveguide core, resulting in adjacent low-intensity regions in an outer region of the waveguide core. The structure 500 contains a first plurality of attachments 512 placed along one side of the core 514 of the multimode waveguide adjacent the low-intensity regions, and may further contain, as illustrated, a second plurality of attachments 512' placed along a second side of the multimode waveguide core adjacent low-intensity regions. Particularly, in FIGS. 5A-5C, waveguide sections 512, 512' are placed opposite each other along the multimode waveguide at locations corresponding to the minimum-width-of-intensity points that periodically occur along the propagation path. The multimode waveguide and the waveguide sections 512, 512' collectively form a crossing waveguide structure 500 with a period $L_{period}$, which is related to the period of the optical field 510 as:

$$L_{period} = L_{beat} N; \text{ where } N = 1, 2, 3, \ldots \quad (2)$$

In the case illustrated in FIGS. 5A-5C, N≈1. In general, N may be any positive integer. Furthermore, the structure 500 need not be necessarily strictly periodic. Rather, the attached waveguide sections 512 that form the crossing waveguides may be inserted adjacent any subset of the minimum-width points of the optical field 510. FIG. 5B shows the simulated intensity pattern 520 (square of the field amplitude 510) of structure 500, and FIG. 5C shows in more detail the lower-intensity pattern, obtained by plotting the hundredfold of the intensity on the same color-intensity scale (such that the high intensity region is clipped to white).

The addition of attachments 512 to the waveguide 514 changes the periodicity of the optical intensity pattern in comparison to a pattern in an isolated waveguide 400 lacking the attachments (as illustrated, for example, in FIG. 4A). This effect is due to residual fields near the sidewalls of the waveguide core, which gain additional phase shifts from the attachments 512. Therefore, in various embodiments, the entire structure 500 is designed with a correction to the periodicity, such that, in the final structure, $L_{period}$ matches $L_{beat}$, satisfying equation (2), as shown in FIGS. 5A-5C and explained in further detail below. When this matching is achieved, the structure supports a low-loss propagating Bloch wave.

In the simulated example in FIGS. 5A-5C, the waveguide core and attachments are formed of silicon (index n=3.5), placed on a silica undercladding (n=1.45), and clad by air on the top and sides (n=1.0). The example is simulated in 2D, taking the vertical dimension into account through the effective index method, which is described in the literature. The 2D structure in FIGS. 5A-5C has an effective core index of 2.43 and cladding index of 1.2, and is designed for and, in this example, excited at a wavelength of 1200 nm. The periodicity of the waveguide attachments is $L_{period}$=2.45 µm. In general, the periodicity of the attachments may be about twice the free-space wavelength of the first mode, i.e., the wavelength at which the structure is excited. The width of the waveguide core may be, in some embodiments, about five-sixths of the free-space wavelength of the first mode. As shown, the excitation field 516 at the left of the structure is only the fundamental mode (like FIG. 4A, top), and not a superposition of modes (as in FIG. 4A, bottom). However, after propagation through a couple of crossings, the field self-organizes into the low-loss Bloch wave 510, as this is the lowest-loss field pattern that propagates in the structure, and all other modes of propagation quickly attenuate. In the first two to three crossings 518, the fundamental mode alone does not have the low-loss field pattern. Since those parts of the field that do not fit the low-loss pattern are radiated off, excessive radiation loss is incurred in this region, as shown in FIG. 5C by stray radiated light to the sides of the waveguide 514 in the crossing waveguide sections 518. The first crossing incurs about 0.2 dB optical loss. Losses in subsequent crossings decrease, and reach about 0.04 dB loss per crossing along the majority portion of the waveguide. Thus, the loss does not exceed 0.04 dB per attachment, and preferably does not exceed 0.02 dB per attachment. In other embodiments, the loss does not exceed 0.05 dB per attachment. The total insertion loss of the structure, from the fundamental input mode into the fundamental mode of the output at the right, is about 0.75 dB. About half of this loss is due to mismatch at the first crossing and residual power in the third mode at the output, where the concentration of all power in a single mode is desirable.

Figure 6A:
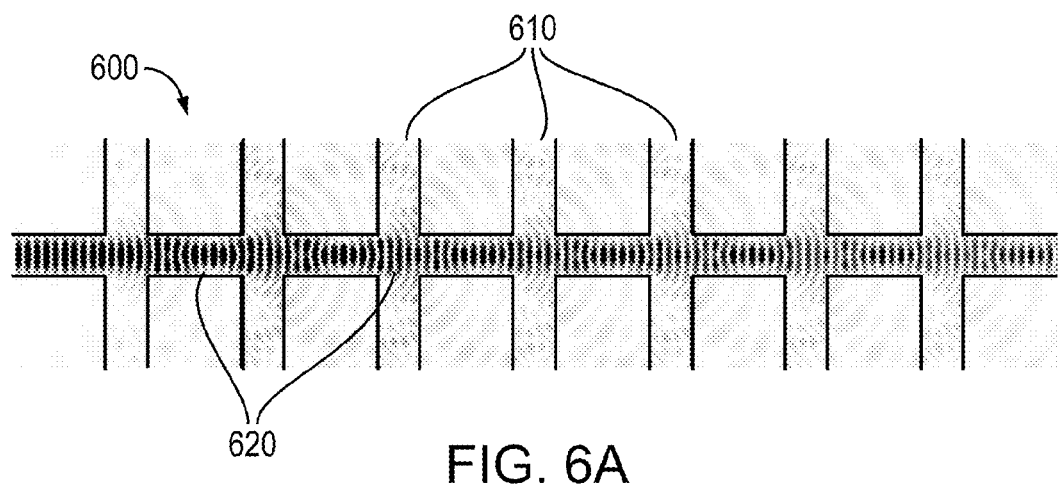
FIGS. 6A-6C are illustrations of the amplitude, intensity, and intensity multiplied by 100, respectively, of a simulated light pattern in a mismatched periodic crossing waveguide structure.
Figure 6B:
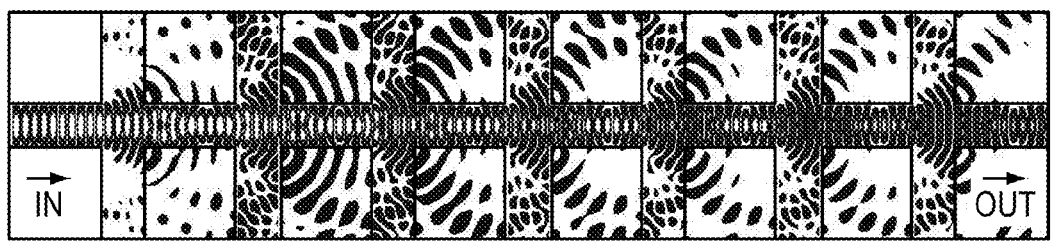
Figure 6C:
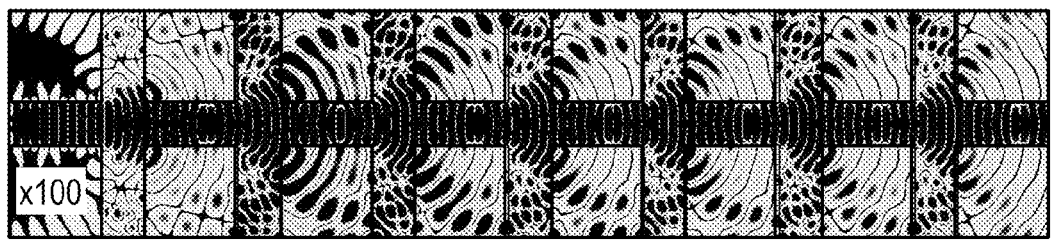

The existence of the low-loss Bloch wave depends on the structure having appropriate dimensions, i.e., a correct $L_{period}$ satisfying equation (2). Thus, not all structures support a low-loss Bloch wave. FIGS. 6A-6C show a structure 600 similar to that in FIGS. 5A-5C, but with attachments 610 spaced by $L_{period}$=3.675 µm≈1.5 $L_{beat}$, not satisfying equation 2. In this case, the field pattern 620 does not progress from the fundamental mode into a low-loss Bloch wave, and instead exhibits high radiation losses all the way along the structure. The intensity pattern (FIG. 6B) shows high losses, visible to the eye over seven crossings. An amplified plot of the intensity pattern (FIG. 6C), showing more clearly the lower-intensity radiated fields, shows power radiating from the structure at each junction. Although structure 600 has the same dimensions as structure 500 in FIGS. 5A-5C except for $L_{period}$, a total loss of 4.5 dB is obtained across the entire structure with seven crossings, i.e., a loss of 0.65 dB per crossing—about 15 times more loss per crossing than the appropriately period-matched structure in FIGS. 5A-5C incurs.

The embodiment shown in FIGS. 5A-5C allows for low losses of about 0.04 dB per crossing, but has a substantial one-time coupling loss of 0.2 dB at the input due to mode mismatch, and a similar loss due to residual power in the third mode at the output, where the concentration of all power in a single waveguide mode would be preferable. The low-loss Bloch wave 530, once settled, gives by its makeup the relative amplitudes of the various waveguide modes that, if excited directly, would right away result in the low-loss Bloch wave, thereby avoiding coupling losses.

Figure 7A:
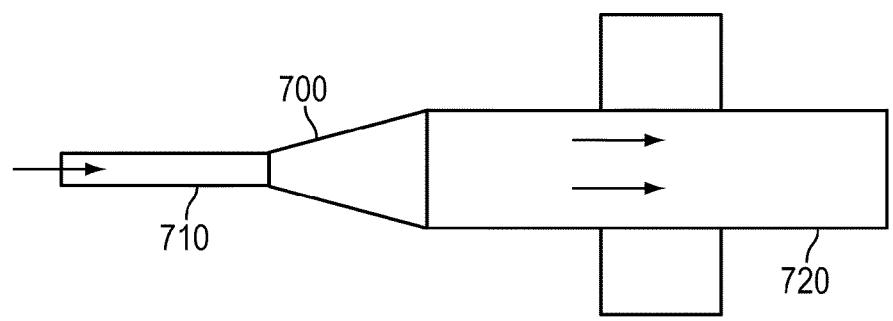
FIGS. 7A and 7B are schematic diagrams of two mode-coupling optical structures including tapered waveguide sections in accordance with some embodiments of the invention.

In certain embodiments, an optical waveguide structure such as the waveguide crossing array 500 of FIGS. 5A-5C is supplemented with "mode couplers" that aid in the excitation of modes at a desired amplitude ratio, and thereby in the excitation of Bloch waves. Two exemplary mode couplers are illustrated in FIG. 7. Coupler 700, shown in FIG. 7A, connects a single-mode input waveguide 710 to the multimode waveguide 720, which may be the waveguide 514 of structure 500. A mode coupler 700 for coupling modes of the same symmetry (i.e., even-order modes only, or odd-order modes only), as is the case in the crossing array 500, may take the form of a symmetric tapered waveguide section (FIG. 7A) with a length much shorter than that of an adiabatic structure, namely, a length substantially shorter than the beat period ($L_{beat}$) of the two modes being coupled. The cross-section of the core of the tapered waveguide section 700 matches, on either end, the cross-section of the core of the waveguide connected thereto. The tapered waveguide section 700 acts like a coupling element between modes one and three of a waveguide (or, more generally, between any two like-symmetry modes), and avoids coupling modes one or three to the second mode, which is also supported by the waveguide. As illustrated, the tapered waveguide section 700 has one input port, i.e., one mode in the input waveguide 710, and two relevant output ports, i.e., two relevant modes, the first and third, in the output waveguide 720. As such, it is functionally similar to a (potentially asymmetric) Y-branch power splitter for single mode waveguides, but serves the same function for modes. More generally, the tapered waveguide section 700 may also have multiple input ports, i.e., may be connected to a multimode input waveguide. Then, it may be functionally equivalent to a directional coupler between two single mode waveguides, as such having two input and two output ports.

A directional coupler, such as the tapered waveguide section 700, may have a wavelength-dependent coupling ratio from a mode of the input waveguide 710 mode to the modes of the output waveguide 720. On the other hand, it may be desirable to enable operation of a low-loss Bloch wave structure, such as the waveguide crossing 500 in FIGS. 5A-5C, over a wide wavelength range. Then, excitation of a particular ratio of mode amplitudes over a broadband wavelength range requires a mode coupler with control of wavelength dependence.

Figure 7B:
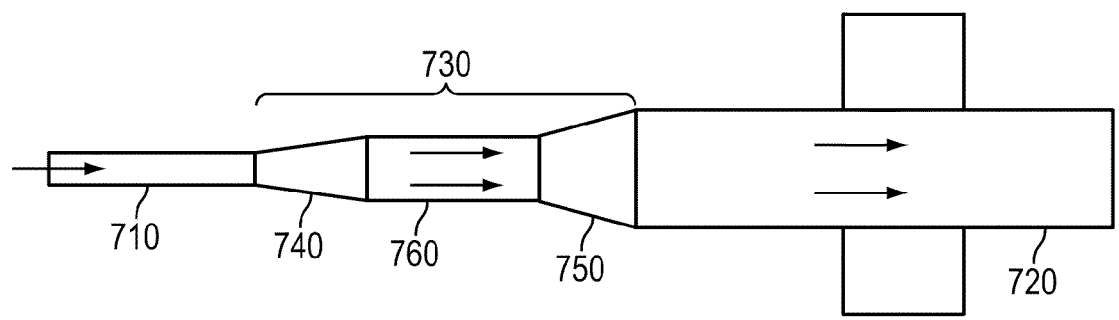

FIG. 7B illustrates an embodiment of a mode coupler 730 with control of wavelength dependence. Such a structure may be used to couple light from a waveguide 710, e.g., a single-mode waveguide, into two desired modes of a multimode waveguide 720, thereby inducing, for example, a light intensity pattern of varying width or lateral position as described above. The mode coupler 730 may include a first tapered waveguide section 740 and a second tapered waveguide section 750, and a multimode waveguide section 760 connecting them, thus forming an interferometer. The cross-section of the core of waveguide section 760 generally differs from the core cross-sections of both waveguides 710, 720. The core cross-sections at both ends of the tapered waveguide sections 740, 750 may be selected such as to match the corresponding core cross-sections of the waveguides or waveguide sections they are connecting. The multimode waveguide section 760 functions analogously to an unbalanced Mach-Zehnder (MZ) interferometer (i.e., one with unequal arm lengths) when it couples two modes. The first tapered waveguide section 740 may be considered to be equivalent to a Y branch, and the second tapered waveguide section 750 may be considered to be equivalent to a 2×2 directional coupler. The multimode waveguide section 760 between the two tapered waveguide sections 750 provides different propagation phases for the two modes if the two modes have different propagation constants in that section, hence emulating different physical path lengths by providing different optical path lengths for the two modes in the same physical length.

Unbalanced MZ interferometers, and, consequently, coupling structures 730, have a sinusoidal frequency response, i.e., a sinusoidal dependence of the coupling ratio between input and output modes on the frequency. As such, they may be designed so that the operating point is at the peak of the sinusoidal curve, thus making the coupling independent of wavelength, or at one or the other side of the peak, thus creating a desired positive or negative wavelength dependence of the coupling. The coupling strength at the peak is determined by the coupling strengths of the two tapered waveguide sections 740, 750, and the wavelength period is determined by the difference in path lengths for the two modes in waveguide section 760. Because the coupler structure 730 in FIG. 7B, operating on two modes of a waveguide, is functionally equivalent to an unbalanced MZ, operating on the single modes of two separate waveguides, the same design principles can be employed to produce a desired, including a flat, wavelength dependence in the coupling ratio.

Figure 8A:
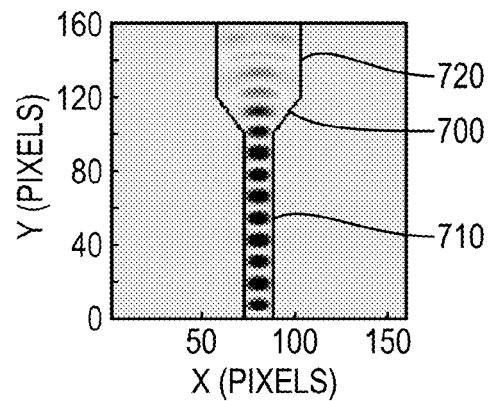
FIG. 8A is an illustration of the simulated light pattern inside a single-mode and a multimode waveguide coupled by a tapered waveguide section in accordance with some embodiments of the invention.
Figure 8B:
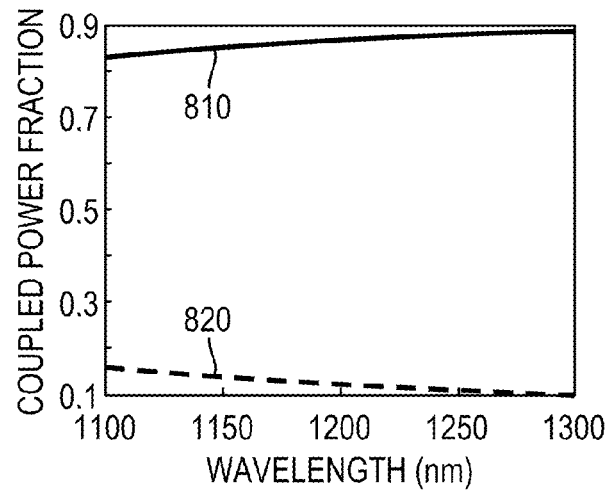
FIGS. 8B and 8C are graphs of the power fractions coupled into the first and third modes of the multimode waveguide of FIG. 8A, and the fraction of the total input power coupled into the multimode waveguide, respectively.
Figure 8C:
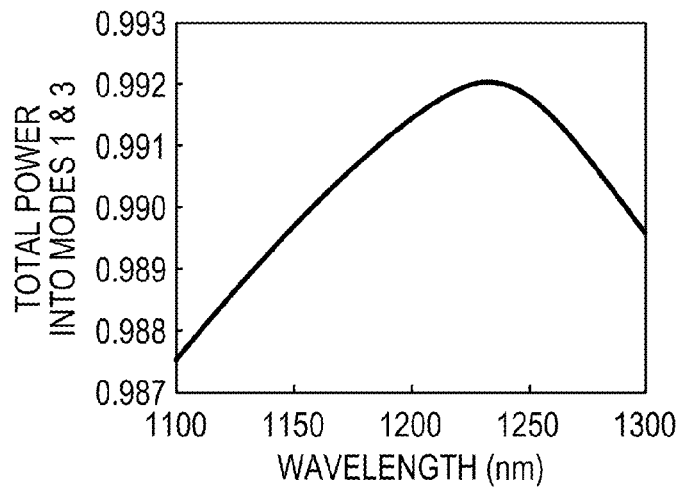

The design of a waveguide structure using only a single tapered waveguides section 700 to couple light between two waveguides, and the corresponding wavelength dependence of such a structure, which may call for the more sophisticated couplers 730, are illustrated by simulations shown in FIGS. 8A-8C and 9A-9D. In FIGS. 8A-8C, a structure including a tapered waveguide section 700 connecting a single-mode waveguide of width 400 nm to a multimode waveguide of width 1.15 μm is simulated. FIG. 8A shows the coupled waveguide structure (on a pixel grid with 25 nm pixels), as well as the simulated electric field amplitude at 1200 nm wavelength. FIG. 8B illustrates the coupled power fractions 810, 820 from the fundamental mode of the input waveguide 710 to the fundamental (810) and third order (820) modes of the output waveguide 720 as a function of wavelength. For a 0.5-μm-long tapered waveguide section 700, shown in FIG. 8A, the simulated response places about 13% of the power in the third mode, and the remainder in the fundamental mode, with the exception of about 1% of the power which is lost to radiation in the short taper. Hence, this tapered waveguide section is not suitable for exciting the modes in an amplitude ratio of, for example, 1.0:0.3 (power ratio 1:0.09), as illustrated in FIG. 4A. However, a longer tapered waveguide section may enable this ratio. In general, longer tapered waveguide sections result in lower coupling ratios, while shorter tapered waveguide sections give higher coupling ratios.

As shown in FIG. 8B, the fractions 810, 820 of power coupled to the fundamental and to the third mode are also wavelength-dependent, varying by over a factor of 2 over a 200 nm wavelength range. Therefore, for broadband operation, interferometric couplers such as the mode coupler 730 of FIG. 7B, which includes two tapered waveguide sections, may preferably be employed.

Furthermore, in the simulation shown in FIG. 8C, which plots the total power in modes 1 and 3 at the output waveguide 720, not all power is transmitted to the desired modes, i.e., the short tapered waveguide coupler 700 exhibits radiation losses.

FIG. 9A illustrates a mode-coupling structure with a longer tapered waveguide section 700, of 0.75 μm length. FIG. 9B shows the fractions 810, 820 of power coupled to the fundamental and third order modes, respectively. The ratio is plotted in FIG. 9C, showing a 1:0.09 ratio of powers in modes 1 and 3 as desired to obtain a pattern like that in FIG. 4A (bottom). The total power in modes 1 and 3, shown in FIG.

9D, is above 99.7%, showing that longer tapered waveguide section, even at sub-micron length, enable smaller radiative losses (here below 0.3%).

Figure 10A:
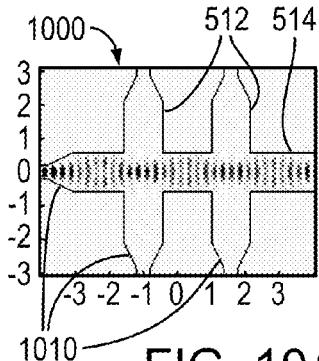
FIGS. 10A and 10B are illustrations of the input and propagated simulated light patterns, respectively, in a crossing waveguide array in accordance with some embodiments of the invention.
Figure 10B:
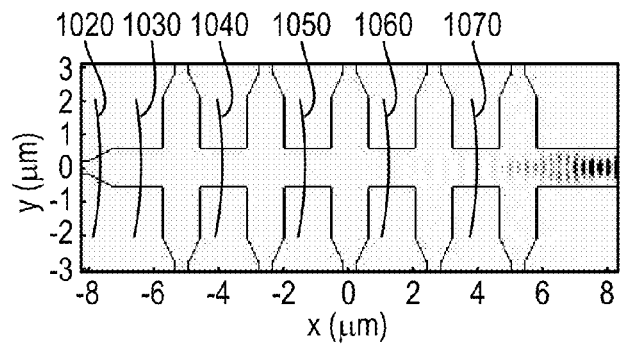

Referring to FIGS. 10A-10D, accordingly, in one embodiment, a waveguide crossing array 1000 is provided that includes a plain waveguide crossing array 500 formed of a multimode waveguide 514 with crossing multimode waveguide attachments 512, and mode couplers 1010, e.g., tapered waveguide sections, attached to the multimode waveguides 512, 514. The mode couplers 1010 may be designed to excite the particular ratio of modes (here, fundamental and third order mode) that are found in the low-loss Bloch wave. In the simulation shown in FIGS. 10A-10D, an optical pulse at 1200 nm center wavelength is launched into the crossing array 1000 (FIG. 10A), and propagates through the crossing array (FIG. 10B). To aid in design, one may observe the ratio of local modes in the structure 1000 as the low-loss Bloch wave is being formed. Observation planes 1020 at the single-mode input waveguide, observation planes 1030 before the first crossing, and observation planes 1040, 1050, 1060, 1070 after each respective crossing may be used to monitor the composition of the total field pattern in terms of contributions of various local modes.

Figure 10C:
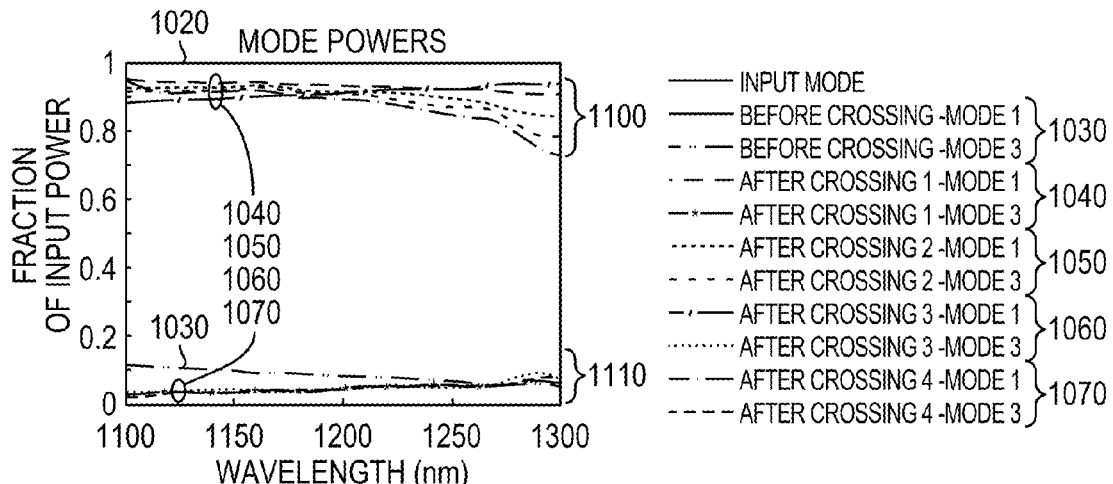
FIGS. 10C and 10D are graphs of the power fractions and power ratio, respectively, of the first and third modes creating the pattern of FIGS. 10A and 10B.
Figure 10D:
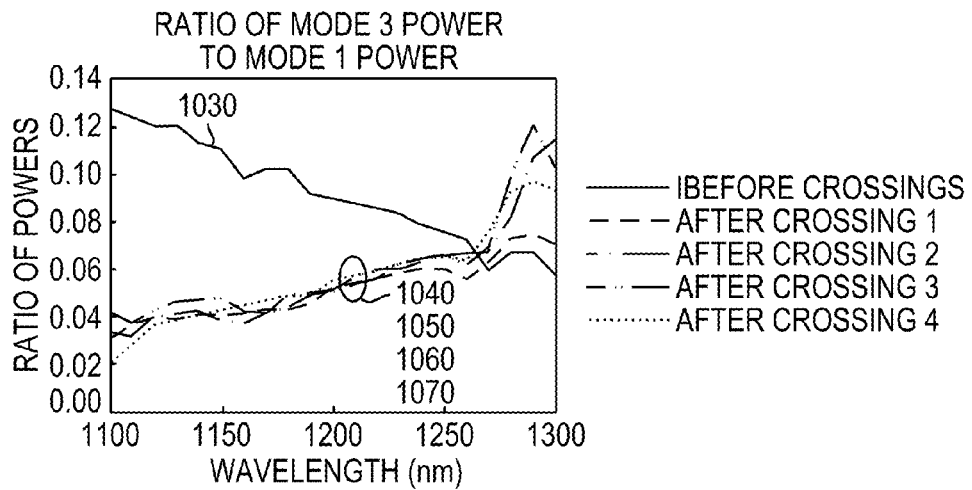

Starting with an amount of power normalized to 1.0 in the single-mode input waveguide 1020, FIG. 10C shows the simulated fraction of power 1100 in the fundamental mode and the fraction of power 1110 in the third-order mode, at a cross-section 1030 before the first crossing, and at cross-sections 1040, 1050, 1060, 1070 after each respective crossing. At a cross-section 1030 before the first crossing, the ratio of excited powers is 1:0.09 (shown in FIG. 10D), as designed by using the mode coupling taper 700 shown in FIG. 9. At the cross-section 1040 after the first crossing, the ratio of powers is lower, at 1:0.05, indicating that the modes do not incur equal loss in crossing the gap, but that the third mode incurs more loss, and that a unified low-loss Bloch wave is not established. However, further cross-sections 1050, 1060, 1070 after the second, third, and fourth crossings show that the ratio remains at 1:0.05 thereafter, indicating that a low-loss Bloch wave is established after the first crossing sheds part of the power in the third mode, and steady state operation is achieved. Therefore, a modified, slightly longer tapered waveguide section 700 giving a 1:0.05 coupling ratio is needed for optimal operation of this taper, with minimal input coupling (excitation) loss.

As noted previously, the attached crossing waveguides 512 may cause phase shifts in the residual field overlapping with the attachments, thereby modifying the effective propagation constants of the modes locally, and, consequently, the effective beat length, $L_{beat}$, of the optical field patter 510 in the crossing array 1000. The following procedure may be used for designing crossing arrays with reduced losses: First, modes are excited in a simulated structure as shown, for example, in FIGS. 5A-5C, and a Bloch-wave pattern is allowed to emerge. Then, dimensions may be modified and simulations may be repeated to evaluate the loss of the Bloch wave in each case in order to find a set of dimensions that correctly matches periodicities of the coupled structure and the low-loss Bloch wave, i.e., that accounts for the shifts in propagation phase incurred due to the attachments. Once the crossing structure with a low-loss Bloch wave is obtained, the ratio of local waveguide modes excited in that structure may be evaluated, and an appropriate mode coupling taper 700 may be designed (as in FIGS. 8A-8C and 9A-9D) to permit low-loss excitation of the structure from a single-mode waveguide. The structure simulated in FIGS. 10A-10D has a periodicity of 2.475 μm, and length of the multimode waveguide 514 between the wide end of the input tapered waveguide section 700 and the closest edge of the first crossing waveguide 512 is 1.525 μm.

Figure 11A:
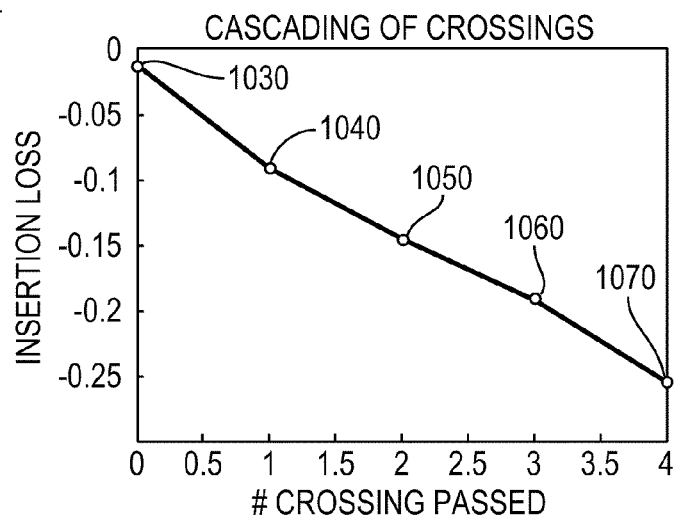
FIGS. 11A-11K are graphs of the simulated cumulative insertion loss of light into the waveguide structure of FIG. 10A-10C as a function of the number of waveguide crossings passed.
Figure 11B:
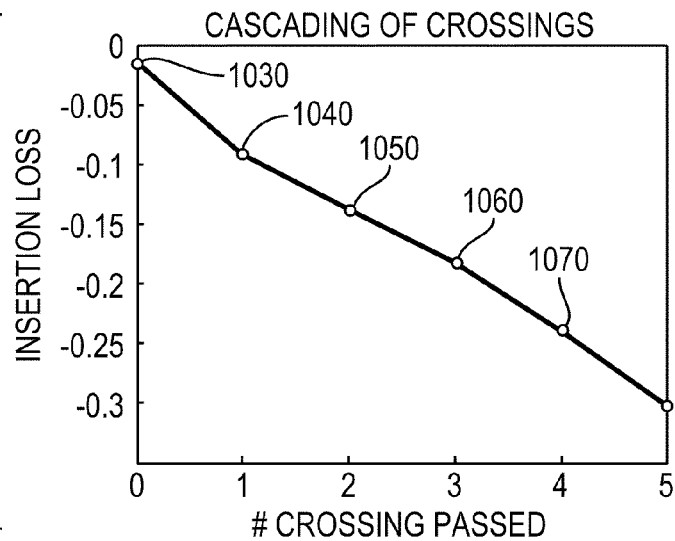
Figure 11C:
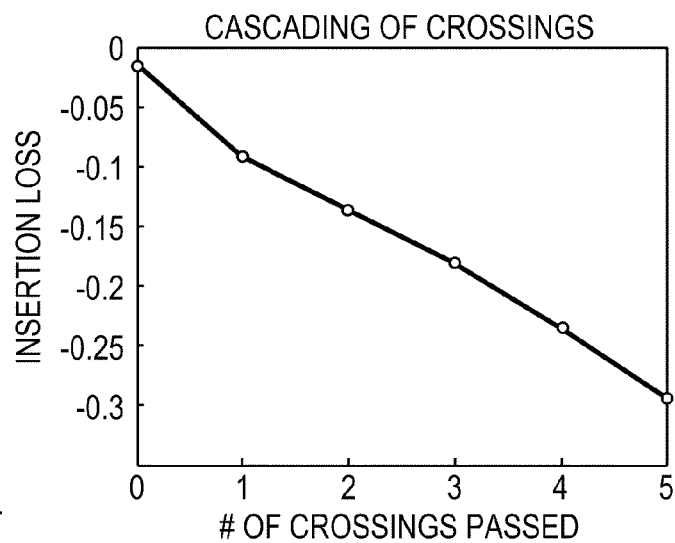
Figure 11D:
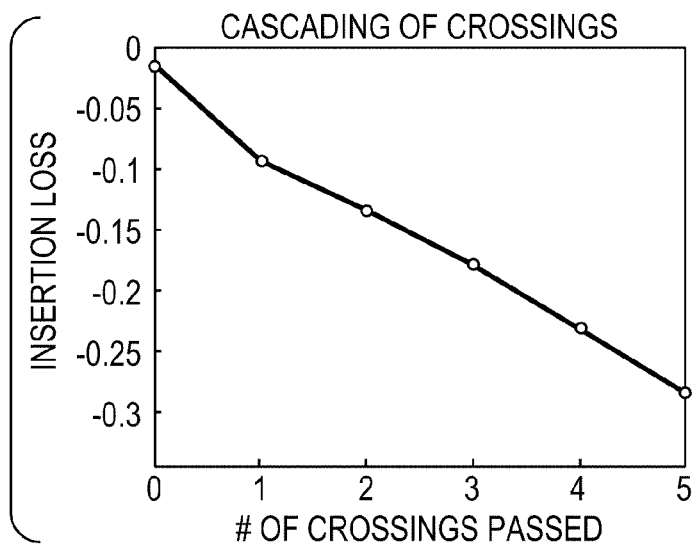
Figure 11E:
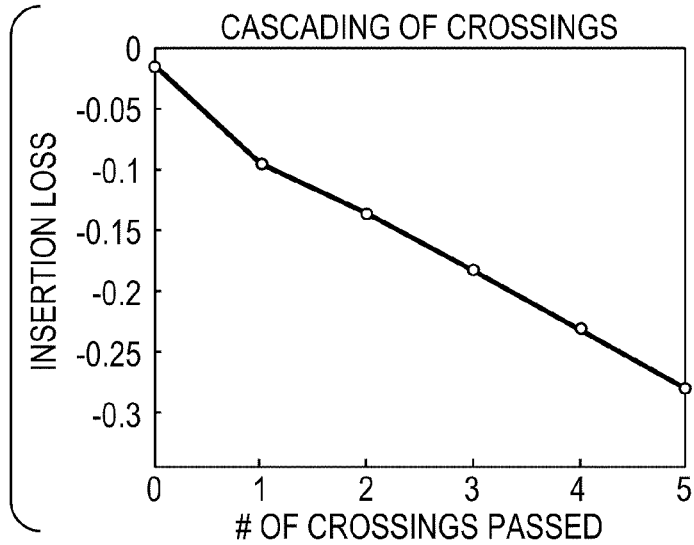
Figure 11F:
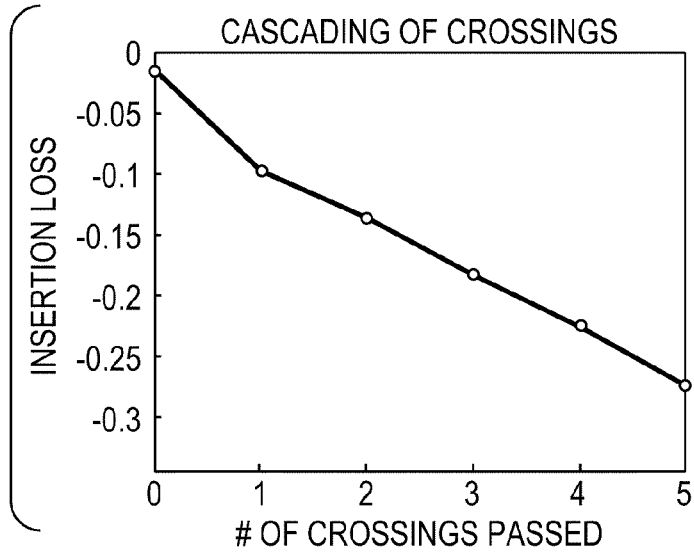
Figure 11G:
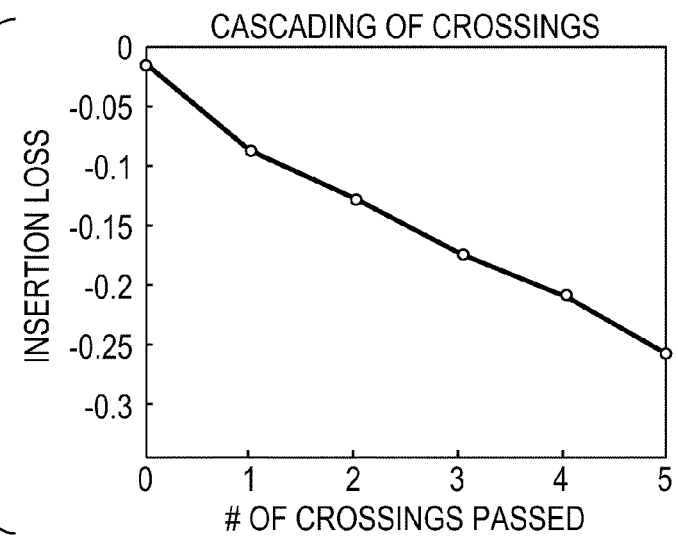
Figure 11H:
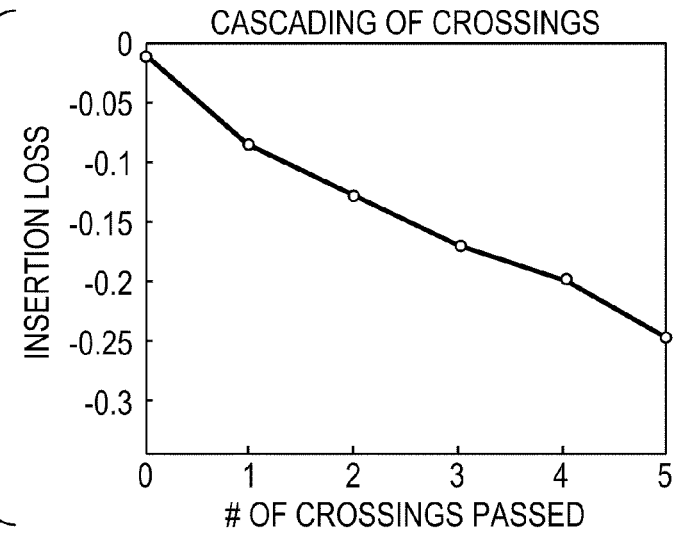
Figure 11I:
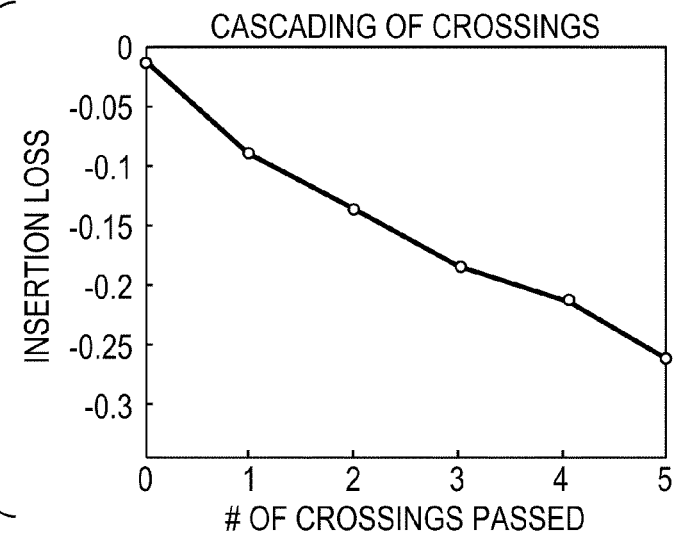
Figure 11J:
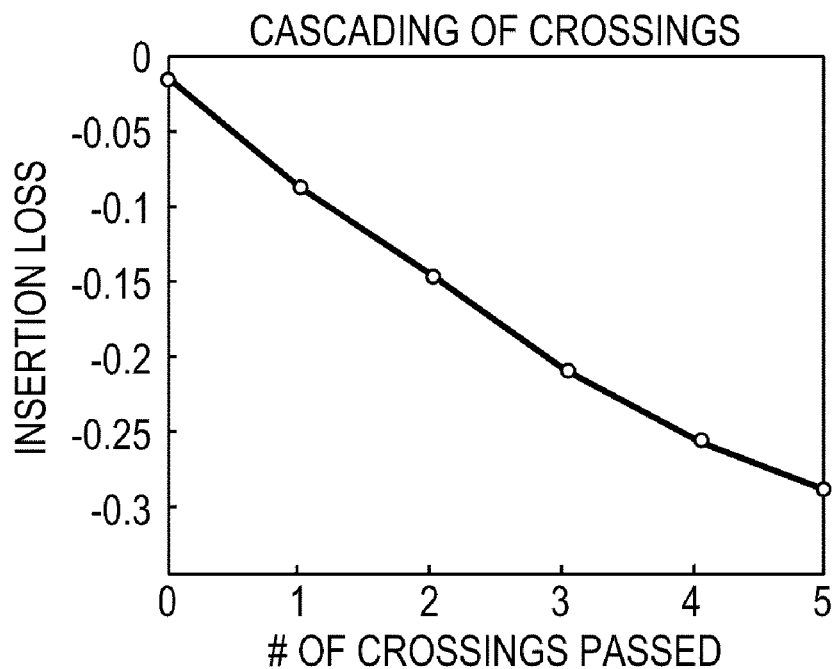
Figure 11K:
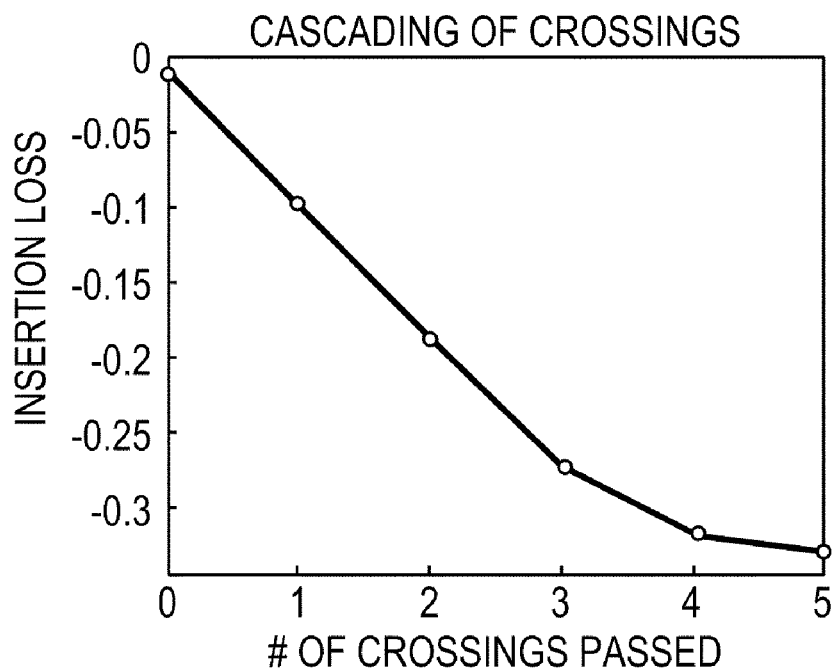
Figure 12A:
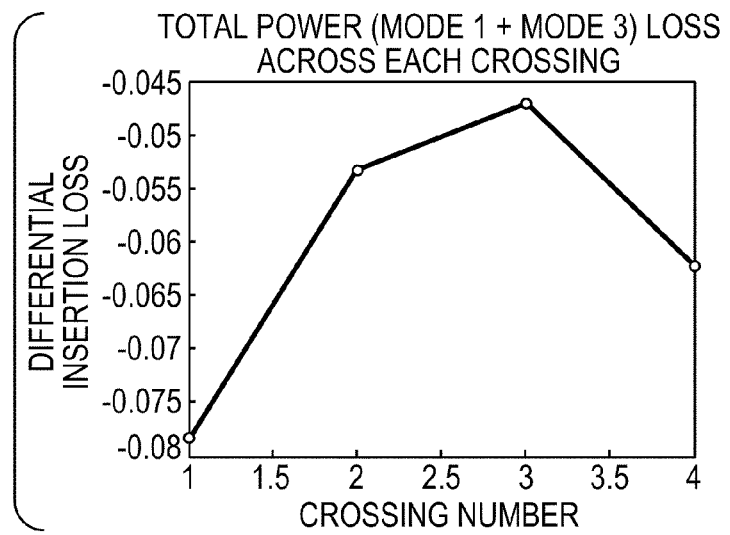
FIGS. 12A-12K are graphs of the simulated differential insertion loss of light into the waveguide structure of FIG. 10A-10C as a function of the number of waveguide crossings passed.
Figure 12B:
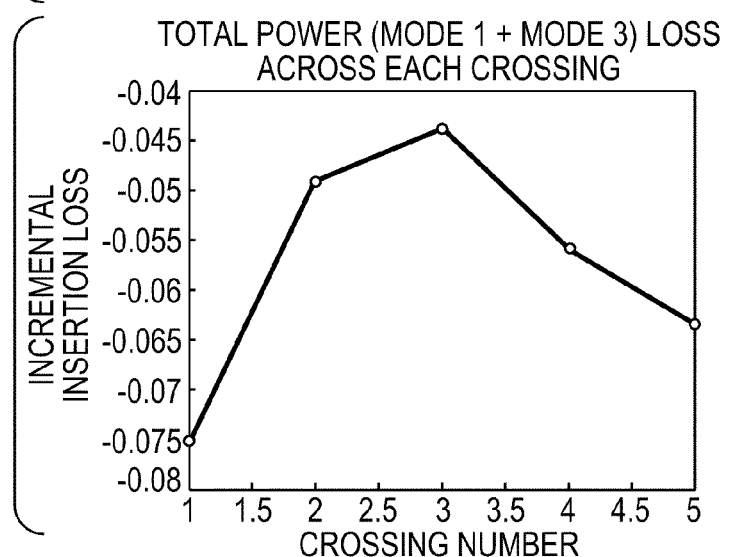
Figure 12C:
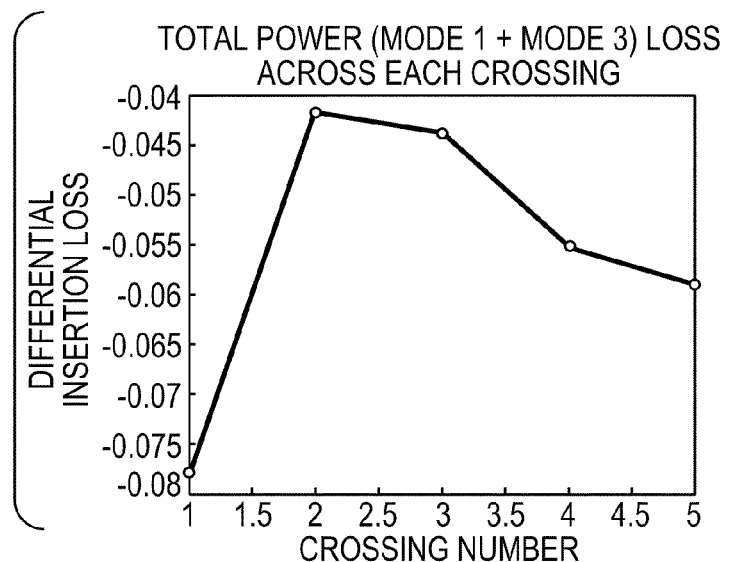
Figure 12D:
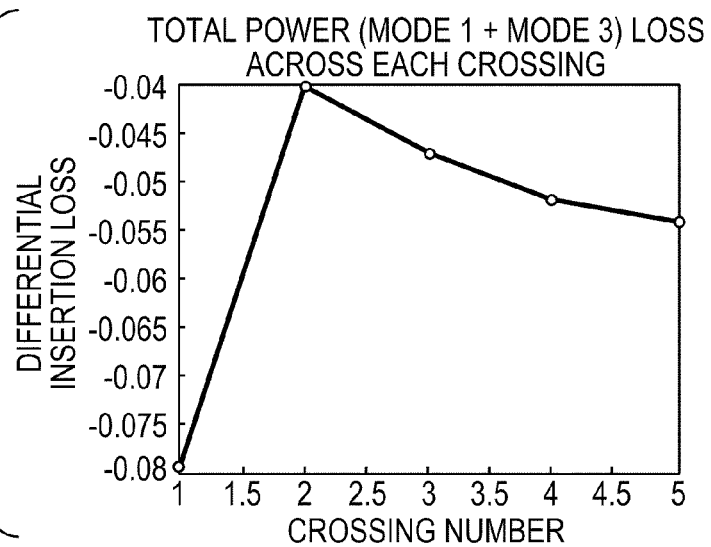
Figure 12E:
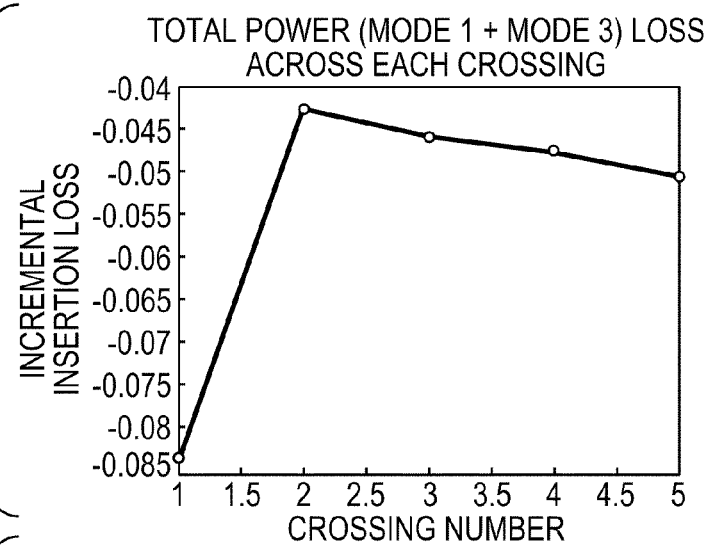

FIG. 11A shows, for a period $L_{period}$=2.6 μm of the crossing waveguide sections, the cumulative insertion loss (in decibels, dB) from the input waveguide cross-section 1020 to multimode cross-sections after zero (1030), one (1040), two (1050), three (1060), and four (1070) crossings. FIG. 12A shows the differential insertion loss, found by subtracting from each insertion loss value the previous one, indicating the power loss (in dB) due to each individual crossing. The figure shows that the losses of the first and last crossing are high, while those of the second and third crossing are comparatively lower. The variation means that a self-sustaining low-loss Bloch wave is not established in this structure.

Figure 12F:
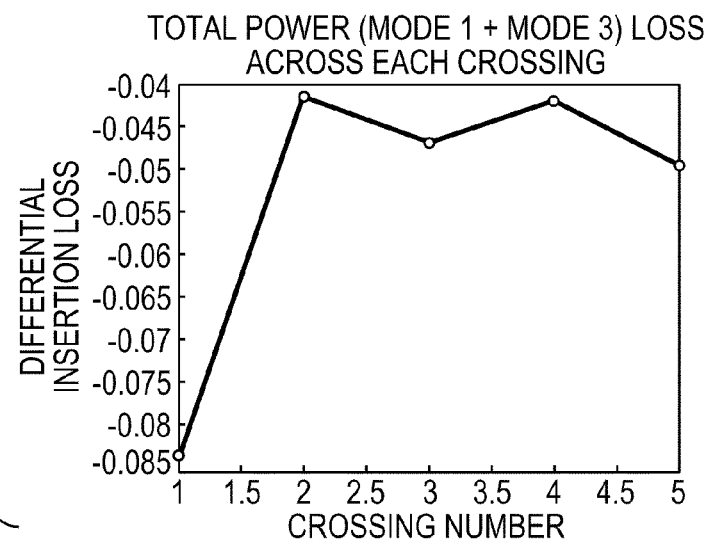
Figure 12G:
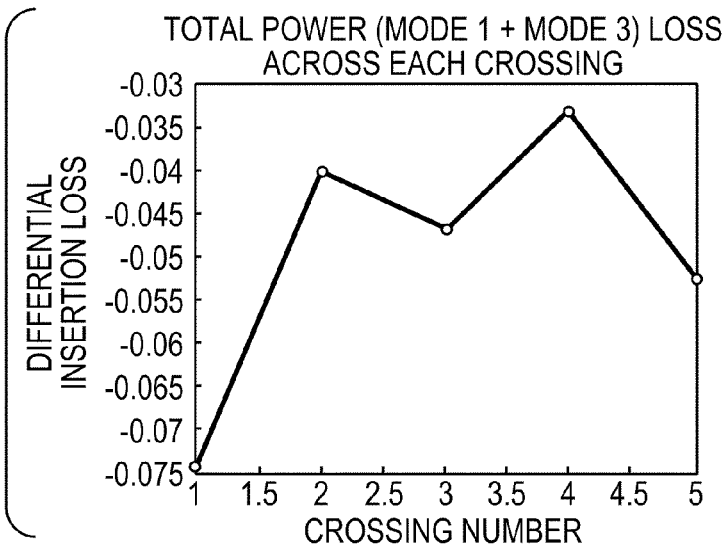
Figure 12H:
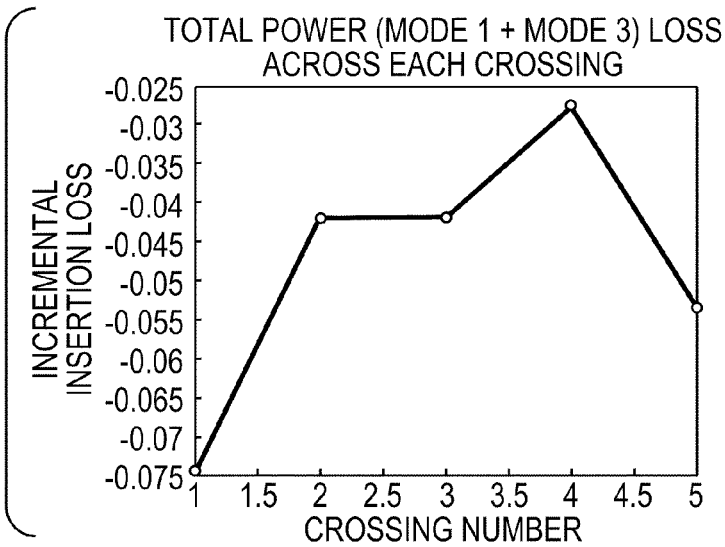
Figure 12I:
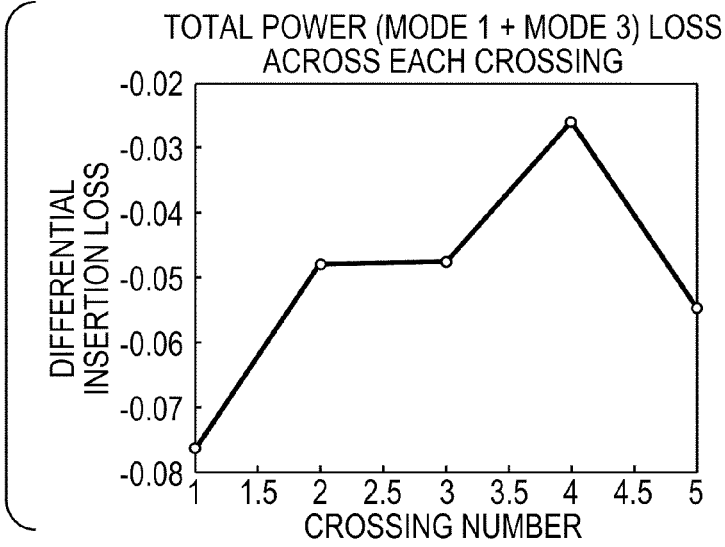
Figure 12J:
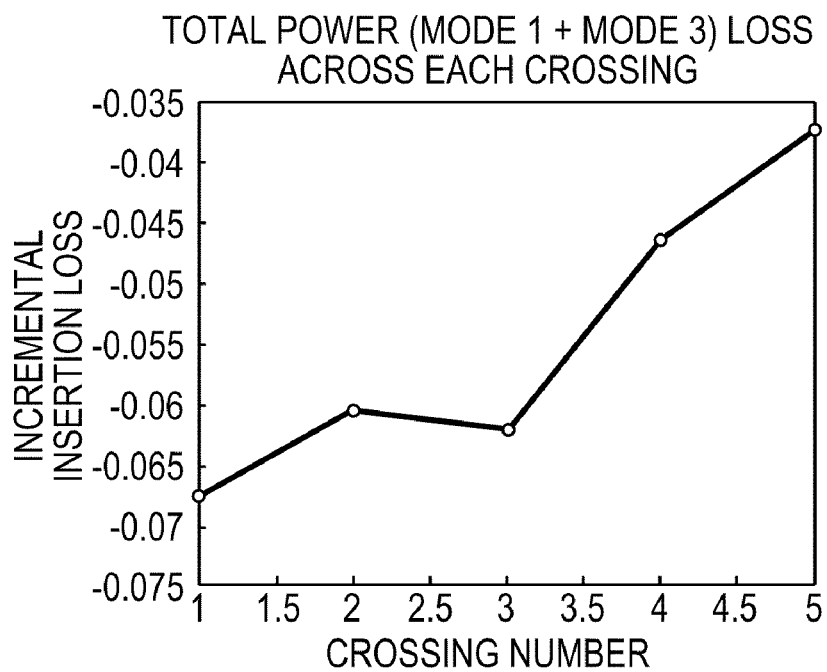
Figure 12K:
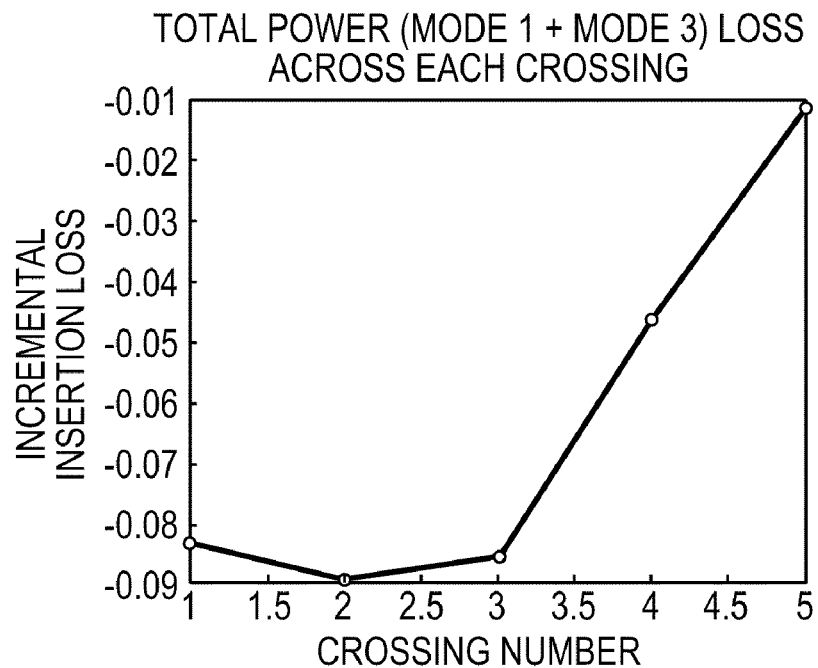

FIGS. 11B-K show the cumulative insertion loss for different choices of the periodicity with which the crossing waveguides are attached, respectively $L_{period}$={2.575, 2.550, 2.525, 2.500, 2.475, 2.450, 2.425, 2.400, 2.375, 2.300} μm. FIGS. 12B-K show the corresponding incremental loss due to each crossing. If losses of the first crossing are disregarded in each case due to imperfect excitation of the ratio of mode amplitudes before the first crossing (before a matched mode-coupling tapered waveguide section 700 can be designed for each case), then the trend of the remaining crossing losses is instructive in obtaining a design with a matched structure and optical field pattern (equation 2). FIGS. 12A-E show variable, generally progressively decreasing, losses per crossing, indicating that the intensity pattern shape is slightly different next to each crossing point. FIG. 12F shows an approximately constant loss per crossing for crossings after the first, showing establishment of a low-loss Bloch wave, and the desired design point for a waveguide crossing array. FIGS. 12G-K show a progressively increasing loss per crossing, indicating lack of a low-loss Bloch wave for the amplitude, and operation on the opposite side of the optimum. It may be noted that the equal losses per crossing (after the first) in FIG. 12F are also the lowest losses per crossing, and as low as or lower than the lowest loss per crossing in all other cases in FIGS. 12A-12E and 12G-12K. This design for the crossing array 500 may be utilized as the basis for finding the relative local mode amplitudes in the Bloch wave, to then lead to an optimal design of a mode excitation coupler 700, or, alternatively, 730.

Figure 13A:
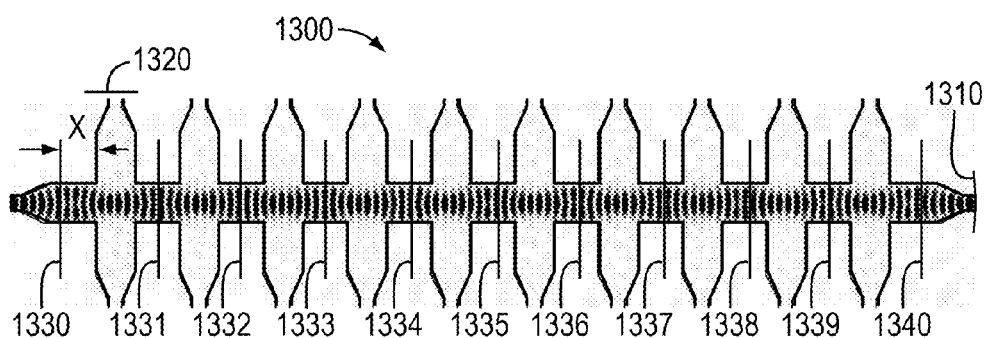
FIGS. 13A-13C are illustrations of the amplitude, intensity, and intensity multiplied by 100, respectively, of a simulated light pattern in a mismatched periodic crossing waveguide structure with input tapers in accordance with some embodiments of the invention.
Figure 13B:
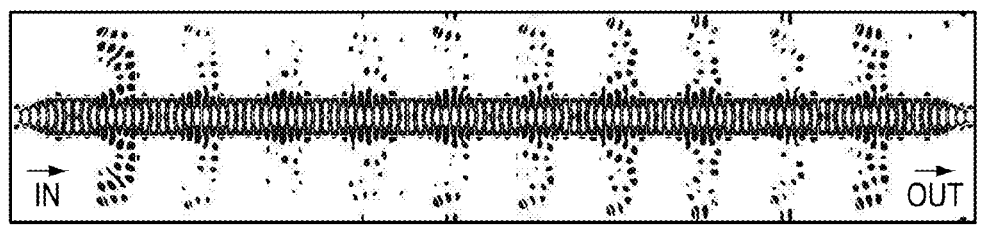
Figure 13C:
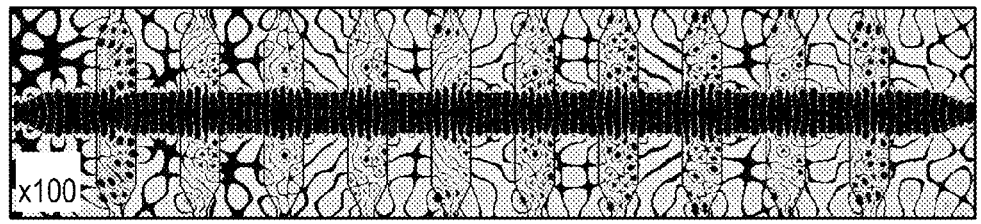

In one embodiment, illustrated in FIGS. 13A-13C, a waveguide crossing array 1300 has a periodicity matched to a low-loss Bloch wave (approximately according to equation 2, with corrections accounted for by the design procedure described above), and is supplemented with tapered waveguide sections 700 for coupling the multimode waveguide 514, as well as the transverse waveguide sections 512, to single-mode input and output waveguides. The wide end of the input taper 700 is placed at a distance x of 1.525 μm from the closer wall of the first input waveguide. Thereby, the modes 1 and 3 that are excited in the appropriate ratio by the mode coupler 700 are given an appropriate propagation distance in order to acquire a relative phase relationship that leads to a minimum-width field pattern at a location where the first crossing is placed. By reciprocity, operation in reverse is the same, so all power may be collected in one single-mode output waveguide by placing an identical output taper 700 at the same distance (1.525 μm in this case) from the last crossing in the array. Then, the multimode pattern simulates a focusing just as the tapered waveguide section at the output catches it, and channels it into a single mode waveguide. In the illustrated example, ten crossings are used, but due to the periodic nature of the matched structure and low-loss Bloch wave, any number of crossings may be inserted. FIG. 13A shows simulated field patterns, and FIGS. 13B and 13C show the simulated intensity patterns of the crossing array 1300. The intensity-amplified plots of FIG. 13C illustrate that the residual radiation intensity scattered into crossing waveguides 512 is small at all crossings, including the first crossing.

Figure 14A:
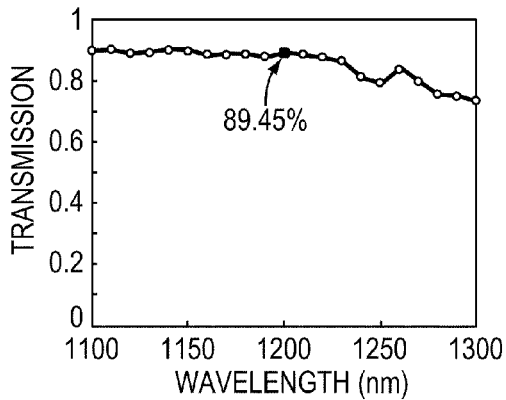
FIGS. 14A and 14B are graphs of transmission efficiency and crosstalk in a crossing waveguide structure in accordance with some embodiments of the invention.
Figure 14B:
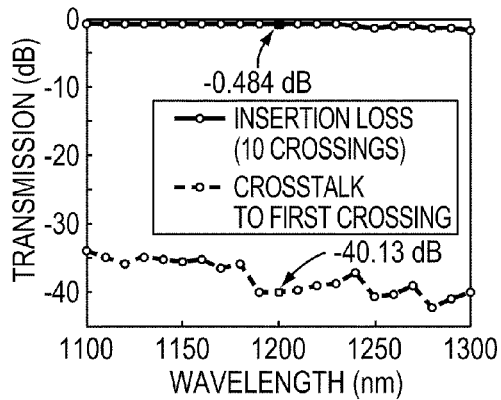

FIGS. 14A and 14B show the transmission efficiency and crosstalk relative to single-mode waveguide ports including the input port 1020, output port 1310, and a first cross-waveguide port 1320. FIG. 14A shows that the crossing array has 89% overall transmission (0.48 dB total loss) from the input single-mode waveguide to the output single-mode waveguide across ten crossing waveguides, at an operating wavelength of 1200 nm, for which it is designed. The bandwidth of operation over which similar losses (defined as losses no more than twice as large) are obtained is at least 150 nm in wavelength, as shown in FIG. 14A, and may extend over hundreds of nanometers in wavelength. This property is based on the fact that the structure is not resonant, and that the periodicity matching of $L_{period}$ and $L_{beat}$ does not depend to first order on the dependence of the propagation constants of the two modes on wavelength. Rather, $L_{beat}$ depends only on the wavelength-dependence of the difference of the two modes. As a result, the device is rather broadband, and, consequently, also insensitive to many types of fabrication variations—in particular, the primary type of fabrication variation in such structures, the tendency for the width of all waveguides to come out symmetrically slightly wider or narrower (±10-20 nm) than designed.

FIG. 14B shows the crosstalk to a crossing waveguide port, an important performance measure for waveguide crossing arrays. The closest port to the input has a maximal crosstalk of about −40 dB, due to the low scattering loss in the regions where transverse waveguide sections are attached; low losses are enabled by excitation of the low-loss Bloch wave.

Figure 14C:
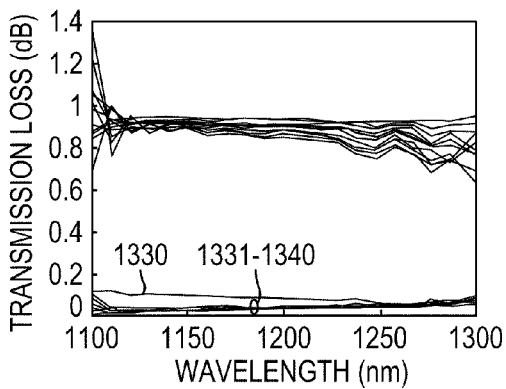
FIGS. 14C and 14D are graphs of the transmission efficiency from the input port to various locations with a crossing waveguide structure in accordance with some embodiments of the invention.
Figure 14D:
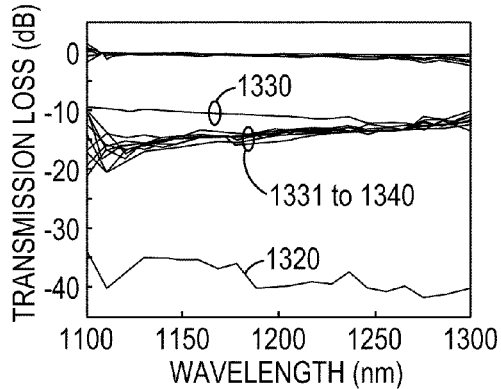

FIGS. 14C-D show the transmission efficiency (or loss) from the input port to total power in a cross-section 1330 before the first crossing, as well as to cross-sections 1331 to 1340 after each respective crossing; as well as to the final output port, and to a first cross-port 1320. The plots in FIGS. 14C-D show that the ratio of powers in mode 1 and 3 is 1:0.09 at the cross-section 1330 before the first crossing, and about 1:0.05 after each crossing thereafter, confirming the establishment of a low-loss Bloch wave in the structure. The first, higher loss is due to the use of a tapered waveguide section 700 designs as in FIG. 9, which is not optimized for this structure that utilizes a 1:0.05 mode power ratio.

Figure 14E:
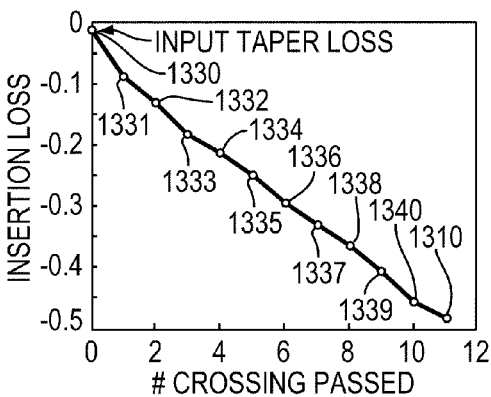
FIGS. 14E and 14F are graphs of the cumulative insertion loss and the differential insertion loss, respectively, in a crossing waveguide structure in accordance with some embodiments of the invention.
Figure 14F:
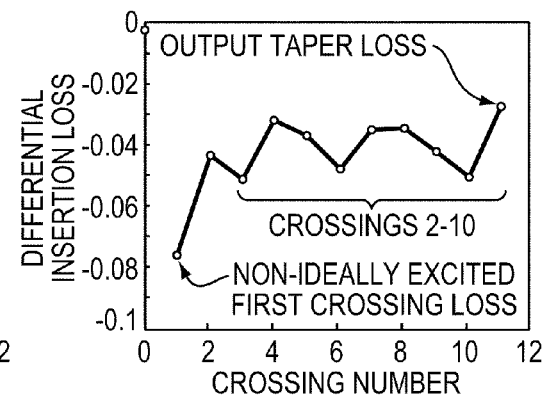

FIG. 14E shows the total power (relative to the input power at the input port 1020) remaining in cross-sections 1330-1340 at points along the multimode waveguide after zero to ten crossings, and a last data point at the single-mode output port. The plot shows 0.48 dB loss for the total structure including ten crossings and two mode coupling tapers 700. FIG. 14F shows the differential loss from one cross-section to the next, i.e., the loss for each individual crossing and taper. This figure illustrates that the unoptimized input and output tapers contribute a radiative loss of 0.02 dB each, and that they contribute to increased loss in the first crossing of 0.08 dB, but that the remaining crossings each have a low loss of 0.04 dB per crossing.

In general, embodiments of waveguide crossings may employ more than two modes, provided that the low-loss Bloch wave conditions, i.e., the periodicity-matching of the waveguide structure and field patterns according to equation 2, may be satisfied.

More generally, the optical structure may be generalized into a two-dimensional array of crossing waveguides by further repeating it along the vertical direction in the same way as it repeats along the horizontal direction (e.g., to make a 10×10 crossing array). On the other hand, with respect to the single in-line crossing array structure 500 or 1300, the crossing attachments 512 need not be identical to the primary multimode waveguide 514. Furthermore, they need not support well-confined guided modes.

Another utility for structures with periodic attachments that incur low optical losses may be their application in optical modulators. In one embodiment, the crossing array structure 1300 may be provided with crossing attachments 512, each attachment containing a p-doped semiconductor region in the core to one side of the multimode waveguide 514, and an n-doped semiconductor region to the opposite side.

In another embodiment, periodicity may be removed, and a single-crossing structure 1500 may be employed, as shown in FIG. 15. The attachments 1510, 1520 on either side of the multimode waveguide 1530 may contain p-doped and n-doped semiconductor regions 1533, 1535, respectively. The top attachment 1510, the waveguide 1530, and the bottom attachment 1520 may then form a p-i-n semiconductor junction, provided that the waveguide core includes a semiconductor material. This design has several advantages that address limitations of conventional optical modulator designs in strongly confining waveguides, such as the modulator 100 illustrated in FIG. 1.

In the modulator design 100 in FIG. 1, the waveguide cross-section 122 is a ridge waveguide. As such, the design balances a trade-off. A deep etch allows for stronger confinement of the optical mode, but increases the resistance of the p-doped, n-doped, and waveguide regions between the contacts due to the thin flanges 130 to the sides of the waveguide core 120. On the other hand, a shallow etch reduces resistance per unit length between the contacts due to an increased cross-section for current flow in the flanges 130, but leads to poorer confinement of the optical mode. The poorer confinement can be mitigated by injection of more carriers to effect an index change in the optical mode, and by displacement of the p-doped and n-doped regions laterally further away from the core to avoid overlap with the optical field, which may otherwise lead to absorption losses. The placement of the doped regions at a larger distance from the waveguide core, in turn, increases the resistance between the contacts.

In contrast, the single-crossing structure 1500 design in FIG. 15 uses a self-confining field pattern 1540 having cross-sections 1550 that support a minimum-width field intensity distribution with low-intensity regions to either side within the core of the waveguide 1530, so that attachments 1510, 1520 may be included without incurring optical loss. Further, p-doped semiconductor material regions may be located in the attachment 1510, and n-doped regions in the second attachment 1520, very close to the optical field 1540, without causing substantial overlap of the light field 1540 with the absorptive doped regions, enabling low optical losses. In turn, the waveguide may be fully etched through (i.e., may be considered to be a ridge waveguide with zero thickness of the flange 130), such that the optical confinement is maximal at positions 1560 where the walls of the waveguide core have contact with the optical field. At the same time, resistance between the electrical contacts through the p-i-n junction may be kept low by locating the doped regions close to the optical field, and providing very thick "flanges" 130 where the p- and n-doped regions 1533, 1535 are, namely, attachments as thick as the waveguide core, rendering the structure equivalent to a very shallow ridge waveguide (one with no etching through at all). Both maximizing cross-sectional area and minimizing distance between contacts serves to reduce resistance.

The electrical contacts 1570, 1571 may be attached to the p-doped and n-doped regions 1533, 1535 via metal silicide contacts 1573, 1574 typically fabricated in contact with doped regions to produce low contact resistance. The metal silicide in state-of-the-art CMOS processes may include, for example, nickel silicide.

While the structure 1500 in FIG. 15 provides advantages for circumventing a trade-off between resistance and optical confinement, a limitation of such a design is that it does not optimally distribute charge carriers throughout the optical field in the structure. Namely, charge carriers may be primarily located between the attachments 1510 and 1520, and the optical field closer to the input and output regions of the structures may remain unmodulated. For high efficiency devices, all of the optical field is preferably immersed with carriers when charge is injected into the device. Structures generally based on the engineering of light intensity patterns that vary width and lateral position along the propagation path may be employed to more efficiently distribute carriers, and improve on the design of FIG. 15.

Another embodiment provides a periodic optical structure including a plurality of attachments disposed along one side of the core of a multimode waveguide which supports at least a first mode and a second mode. If such attachments are placed periodically adjacent low-intensity regions of a periodic light intensity pattern excited in the multimode waveguide, and are in an alternating manner provided with p- and n-doped semiconductor regions, then upon carrier injection, charge may fill the entire waveguide core, as carriers travel between the different field regions. The attachments are usually not waveguides, and may be made of a different width than the multimode waveguide. In particular, they may be made narrower, allowing a further reduction in optical loss per attachment, without making them so narrow that they overly increase series resistance.

Designs as just described are valid for light intensity patterns like the one shown in FIGS. 13A-13C, where the width of the intensity pattern varies periodically along the propagation path, but the lateral position is fixed (see also FIG. 2A). However, they may also be implemented using a different light intensity pattern which has a periodically varying lateral position along the propagation path, and whose width may be relatively constant (see also FIG. 2B). While the attached doped semiconductor sections may all be placed along the same side of the waveguide, a "wiggling" light intensity pattern provides an opportunity for modulator designs that further take advantage of such a pattern with an arrangement of attachments on two opposite sides of the waveguide that results in low resistance, filling of the optical field region with carriers, and low optical losses.

Figure 16:
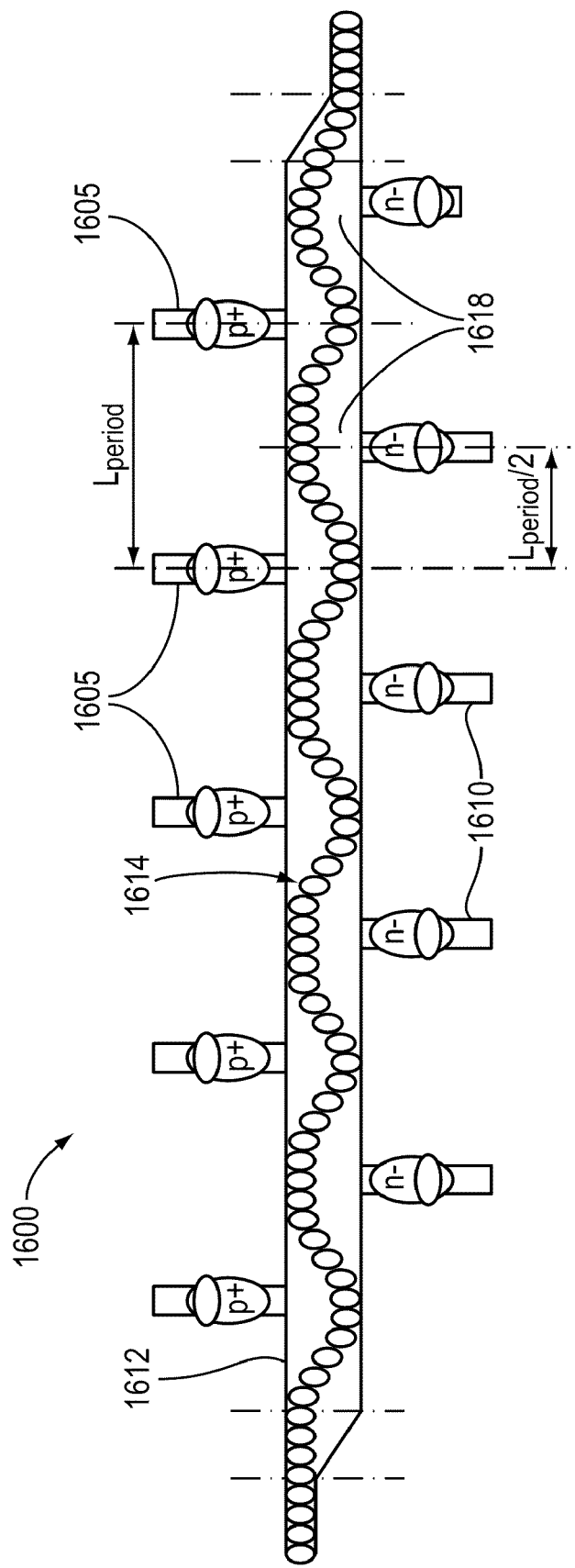
FIG. 16 is a schematic diagram of a multimode waveguide with staggered doped semiconductor attachments in accordance with some embodiments of the invention.

FIG. 16 illustrates an exemplary structure 1600, wherein a first plurality of attachments 1605 and a second plurality of attachments 1610 are disposed along two sides of the core of a multimode waveguide, 1612, in a staggered fashion. The multimode waveguide supports a light intensity pattern 1614 of varying lateral position (see also FIG. 2B), which may be formed by the mixed excitation of a fundamental and a second order mode, or, more generally, modes of opposite symmetries. Such a pattern includes regions of low intensity 1618 on opposite sides of the waveguide core 1612 at staggered points. An attachment 1605 or 1610 may be placed at each of the regions of low intensity 1618, thus optimally using the field pattern 1614 to advantage. Thereby, each attachment 1610 on one side, except, possibly, the first and/or last attachment in the row, is located between two adjacent attachments 1605.

The attachments 1605 on one side of the core 1612 may include semiconductor regions doped with a first type of dopant, e.g., p-type dopant, and the attachments 1610 on the other side may include semiconductor regions doped with a second type of dopant, e.g., n-type dopant. All p-doped regions may be connected to the same positive electrical contact, and all n-doped regions to the same negative electrical contact. When carriers are injected via the electrical contacts, i.e., upon application of a voltage, carriers flow from each p-doped region in an attachment 1605 through the waveguide core 1612 to the left and right, to be collected primarily in one of two n-doped regions in adjacent attachments 1610 on the other side of the waveguide. In such a way, an electrical current is induced in the core of the waveguide, filling the entire optical structure with carriers, with the exception of the input and output areas. In the limit of a structure with many attachments, the latter is a small fraction of the optical mode. However, while a structure in which an attachment is placed next to each low-intensity region may be particularly efficient, such completeness is not necessary to enable the functionality of an optical modulator. In general, doped semiconductor sections 1605, 1610 may be placed adjacent a subset of low-intensity regions. Typically, but not necessarily, an attachment 1610 may be placed between, e.g., midway between, two adjacent attachments 1605 on the other side of the waveguide core 1612.

Figure 17:
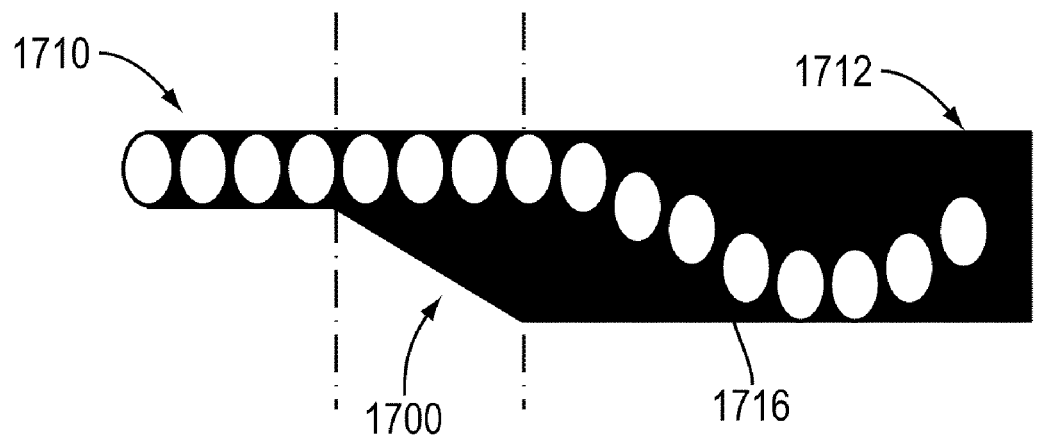
FIG. 17 is a schematic diagram of an asymmetric mode-coupling optical structure including a tapered waveguide section in accordance with some embodiments of the invention.

An important consideration for the generation of a structure such as the optical modulator structure 1600 is a method to excite appropriate fractions of a first and a second waveguide mode with opposite symmetry. The tapered waveguide sections 700 illustrated in FIGS. 8 and 9 can generally not accomplish this task because their symmetry prevents simultaneous coupling of a symmetric mode and an antisymmetric mode. Accordingly, in another embodiment, asymmetric mode couplers are provided. FIG. 17 illustrates an exemplary embodiment of an asymmetric mode coupler 1700 which, by virtue of its geometric asymmetry, may couple modes of opposite symmetry, e.g., a fundamental and a second order mode, from an input waveguide 1710 into an output waveguide 1712. The input waveguide 1710 may be a single-mode waveguide, and the output waveguide 1712 may be a multimode waveguide. The cross-sections of the waveguide cores of waveguides 1712 and 1714 are different. The mode coupler 1700 may take the form of a tapered waveguide section, whose core cross-section on one end matches that of waveguide 1712, and whose core cross-section on the other end matches that of waveguide 1714. Furthermore, an axis at the lateral center of the input waveguide 1710 may be shifted with respect to the central axis of the output waveguide 1712 by a substantial fraction of the width of the smaller of the two waveguides, e.g., by at least $\frac{1}{10}^{th}$ of the waveguide width. In one embodiment, the laterally shifted waveguides may fully line up on one side of the waveguides with each other and, accordingly, also with the tapered waveguide section 1700. The length of the tapered section 1700 determines the fraction of power coupled from the fundamental mode at the input to the second mode at the output, with most of the remaining power staying in the fundamental mode at the output. Accordingly, to distribute power between the modes of the multimode output waveguide 1712, i.e., to achieve a particular ratio of the fundamental and the second order mode which provides for a "wiggling" optical field pattern 1716, an appropriate length is chosen for the tapered waveguide section 1700, typically on the scale of a wavelength in length, and much shorter than typical adiabatic tapered couplers. In some embodiments, modulator structures 1600 include asymmetrical tapers 1700 for input and output coupling of the multimode core 1612 to single-mode waveguides, as illustrated in FIG. 16.

The structures described thus far serve to shape light into and taken advantage of intensity patterns that vary their width or lateral position along the propagation direction (see FIG. 2) in propagating waveguides. As described in the following, the same concepts may be applied to resonant structures as well. In particular, it may be advantageous to use resonant structures in electro-optic modulators, as resonance light makes several round trips around the cavity or ring structure before exiting the output port, thereby providing increased light-matter interaction.

Figure 18:
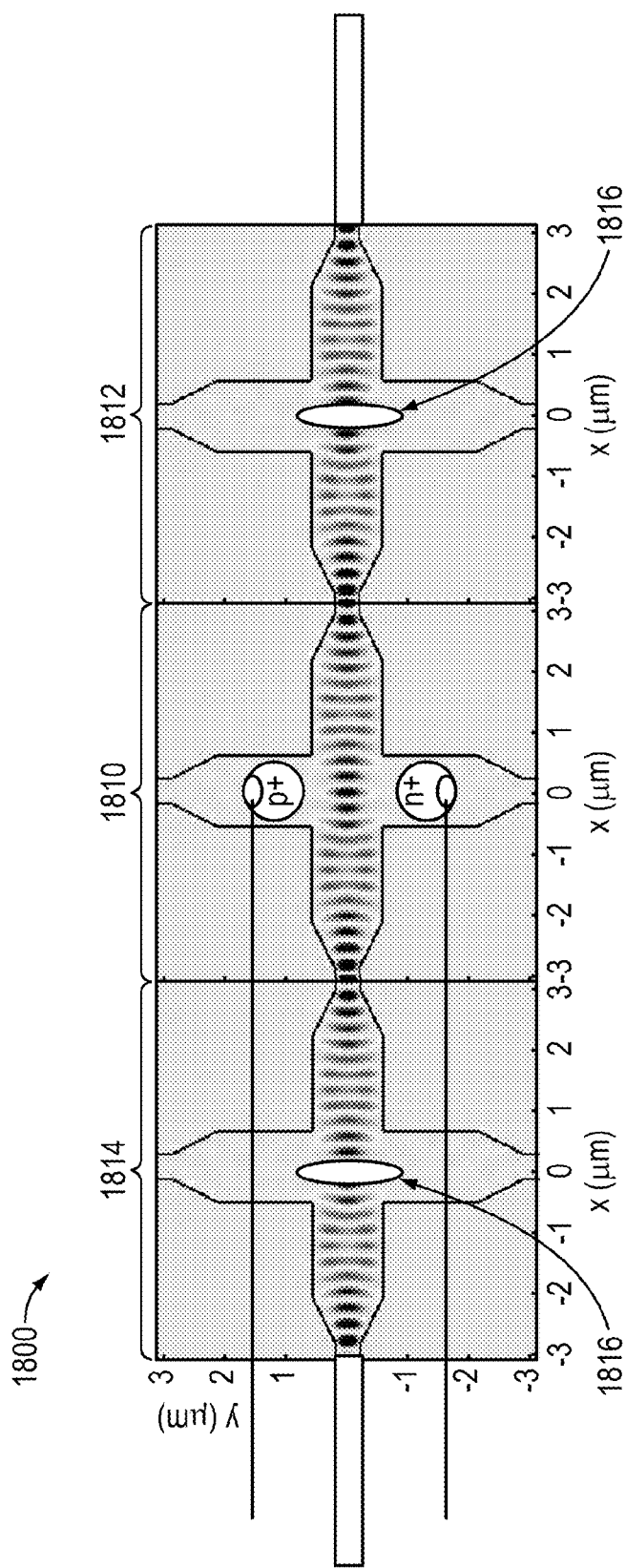
FIG. 18 is a schematic diagram of a resonant multimode waveguide structure comprising doped semiconductor attachments in accordance with some embodiments of the invention.

In one embodiment, illustrated in FIG. 18, a resonant structure 1800 is provided, which includes a first structure 1810 (e.g., as illustrated, the modulator design 1500 of FIG. 15), and connected to the structure 1810 on both sides, two waveguide crossings structures 1812, 1814. Each of the structures 1812, 1814 contains an elliptic hole 1816 whose surface is contoured to lie along the phase front of the light intensity pattern 1820 in the crossing structure. Such holes may be etched into the waveguide cores of the structures. The holes 1816 act as parabolic mirrors that provide a desired reflection coefficient, controllable by design, e.g., by choice of the size of the hole. In particular, they may be designed to provide efficient reflection and transmission with a substantially low fraction of light scattered into other (e.g., radiative) modes. With such mirror designs, an efficient resonant cavity between the mirrors 1816 is formed, incorporating the modulator structure 1810.

Alternatively, a mode-efficient design may be obtained by using a periodic low-loss crossing array like the structure 1300 in FIGS. 13A-13C, including three crossing waveguides, where the first and last structure include holes for low-loss reflectors, and the middle structure forms the modulation structure. These structures form effectively Fabry-Perot-type linear resonators, where the end mirror loss is critical to high performance. A more efficient approach may include the use of ring resonator structures, employing substantially unidirectional propagation in the cavity.

Figure 19:
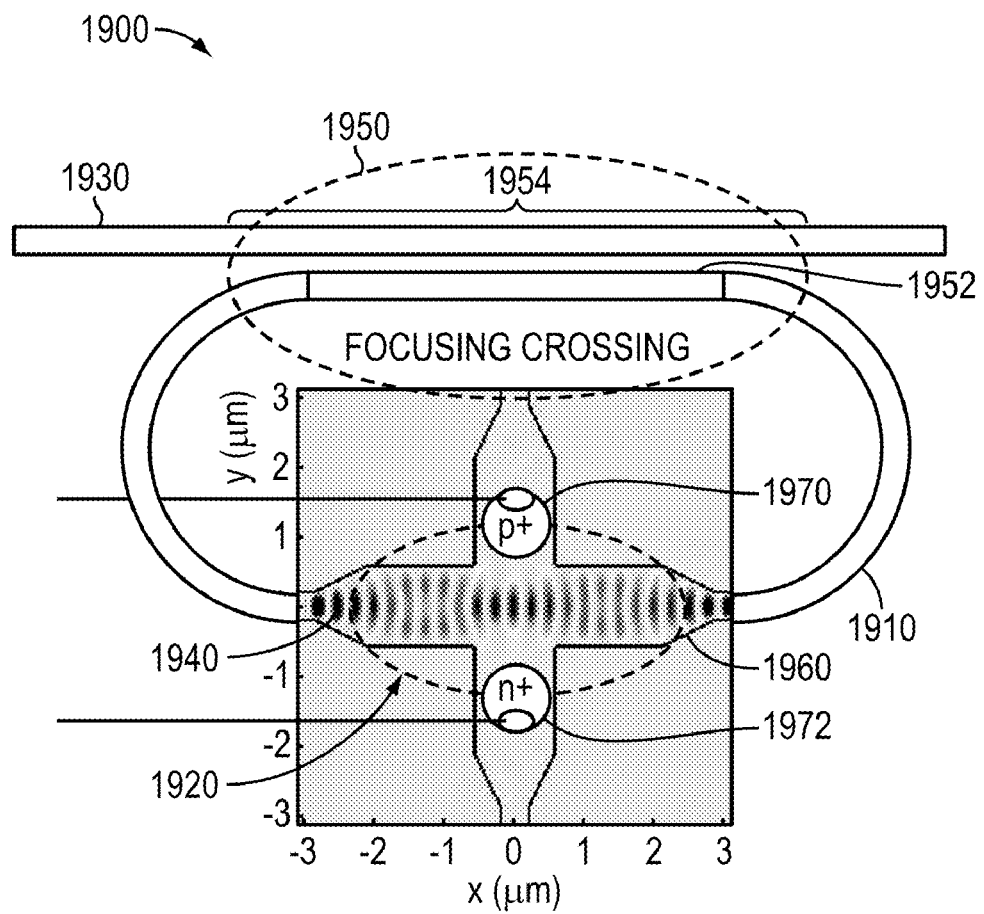
FIG. 19 is a schematic diagram of a loop resonator comprising a multimode waveguide section and a single-mode waveguide section in accordance with some embodiments of the invention.

Accordingly, in another embodiment, a resonant structure 1900 is provided, as shown in FIG. 19. The structure 1900 includes a ring resonator 1910 that includes a core region 1920 supporting a light intensity pattern 1940 with varying width or lateral position along the propagation direction. The ring resonator 1910 may be further coupled to an external waveguide 1930. While the light intensity pattern 1940 is useful for providing various advantages such as including waveguide attachments for crossing waveguides or modulation contacts without incurring optical loss, such a pattern is not generally well suited for coupling light into the external waveguides 1930, because the coupling to the waveguide alters the pattern itself. In particular, if a multimode waveguide section is used to form the light pattern 1930, coupling to an external single-mode waveguide may cause the external waveguide to excite multiple modes of the multimode waveguide section, generally not in the ratio and relative phase relationship required for the light pattern 1930, therefore leading to substantial optical loss.

Therefore, single-mode waveguides may be desired to be used in coupling regions 1950, having a single-mode section 1952 of the resonator, and a single-mode section 1954 of the external waveguide. This combination enables high efficiency coupling of the resonator and the waveguide, where all energy is either coupled to the desired resonator mode or remains in the waveguide, with minimal loss to radiation and unwanted modes.

In one embodiment, a ring resonator 1910 coupled to an external waveguide 1930 is provided, having a single-mode section 1952 coupled to the external waveguide (preferably at a single-mode section 1954 of the external waveguide), and a multimode section 1920, placed away from the coupling region with the external waveguide, such that there is no substantial direct coupling between the multimode section 1920 and the waveguide 1930. The ring 1910 may further include one or more transition regions 1960 that are coupled at a first end to the single mode section 1952 and at a second end to the multimode section 1920. The transition regions may include mode-coupling tapered waveguide sections 700. In this embodiment, by further including p-doped and n-doped regions 1970, 1972 forming a p-i-n junction in the resonator 1910, a resonant modulator is provided. The p- and n-doped regions may have silicide contacts to interface to the metal contact electrodes.

The ring-resonator-based modulator structure 1900 in FIG. 19 utilizes light intensity patterns with varying width that propagate along a straight path of propagation within the region of the varying light intensity pattern 1940. Because ring resonators are curved structures, and attain optimum efficiencies when the radius is as large as possible for a fixed round trip length, it is advantageous to consider designs that maximize the minimum radius. If formerly straight sections are curved, then already curved sections may use a larger (lower radiation loss) radius.

Other embodiments provide structures which make use of light intensity patterns that vary their width or lateral position along a curved path of propagation, as illustrated in FIGS. 3A-B. Such structures may be closed into a closed (e.g., circular) loop, forming a ring resonator. Closed loop waveguiding structures may have circular, oval, elliptical, or other, not necessarily regular shape. However, for obtaining a minimum circumference while maintaining low bending losses, approximately oval, elliptical, or circular geometries are preferably used. FIGS. 20A and 20B illustrate exemplary circular ring resonators 2000, 2005. Each of the structures 2000, 2005 includes a curved multimode waveguide core 2010 that supports a "wiggling" light intensity pattern 2020. Such structures enable compact resonators, because they can maximize the minimum radius along the circumference, enabling a smaller overall radius to be used in the design, while they benefit from the inclusion of multimode waveguide regions 2010 within their circumference.

In one embodiment, illustrated in FIG. 20A, a ring resonator 2000 is provided which includes a curved multimode section 2010 supporting a field intensity pattern 2020 with varying lateral position along the propagation length. This pattern may be achieved by the excitation of two modes of the structure, thereby producing regions of low intensity 2030, 2040 in the core 2010. Furthermore, the resonator 2000 may include attachments 2050, 2051 on the inner radius of the ring waveguide 2010, adjacent low-intensity regions 2030 on the inner radius. The attachments 2050, 2051 may include p-doped and n-doped semiconductor regions 2052, 2053, and may form p-i-n junctions when combined with the ring core 2010 which may include an intrinsic region. When charge carriers are injected via electrical contacts into the p- and n-doped regions, they may fill the resonator 2010, and alter the effective index and resonance frequencies, leading to modulation. Metal contacts may be made to the doped regions 2052, 2053, and a metal silicide region 2060 may be formed in the doped regions as an interface between the doped regions 2052, 2053 and the metal contacts.

Another embodiment, illustrated in FIG. 20B, provides a ring resonator 2005 which has attachments 2070 along the outer radius at points of low optical intensity 2040, in addition to attachments 2080 along the inner radius. The attachments 2070 and 2080 may be placed in an angularly staggered manner when the light intensity pattern is a "wiggling" field intensity pattern 2020 that may include an excitation of opposite-symmetry modes. In this case, the outer attachments 2070 may include p-doped semiconductor regions, while the inner attachments 2080 may include n-doped semiconductor regions (or reverse). The outer p-doped regions may be mutually electrically connected mutually. Likewise, the inner radius n-doped regions may be mutually electrically connected.

Additionally, in another embodiment, fully-closed loop multimode resonators may be designed, which are resonant at the same radius for the fundamental mode and for the second order mode, or, in general, for two or more modes forming the resonant light pattern. Since the free spectral range of different modes differs, a slight change in the radius or temperature may be used to tune the modes by different amounts in order to line up two resonances.

As with the ring resonator designs 1900 in FIG. 19, which employ an intensity pattern whose width varies along the propagation direction, the ring designs 2000, 2100 in FIGS. 20A and 20B may include single-mode regions for coupling to an external single-mode waveguide, as well as transition regions between the multimode and single-mode regions, like designs in FIG. 19. The transition regions may include asymmetric taper structures 1700 to excite the "wiggling" light intensity pattern, like the straight (and non-resonant) version 1600 of the structure in FIG. 16.

In the examples described above, designs at particular wavelengths, typically near 1200 nm or 1550 nm are used for illustration purposes. However, optical structures may be substantially scaled to any wavelength by varying the dimensions of the structure in proportion to the wavelength. In such a way, structures operating at any wavelength may be obtained, provided that materials with like indices of refraction (to those of the original, unsealed design) at such a wavelength may be used. In various embodiments, the wavelength of operation is preferably above 180 nm (ultraviolet) and below 10 micrometers (infrared), and more preferably in the near infrared regime between 1100 nm and 3000 nm, or in the visible regime between 400 nm and 800 nm. However, embodiments of the invention may also be extended to the microwave regime (cm-scale wavelengths).

Optical structures in accordance with the present invention may be fabricated using standard lithography and etching techniques. The fabrication of silicon structures typically starts with a silicon-on-insulator (SOI) wafer, whose top silicon layer has a thickness suitable for single-mode strongly confined waveguides. For an operating wavelength around 1550 nm, as used in many embodiments of the invention, this thickness is typically between 50 and 300 nm. To prepare the wafer for patterning, a resist layer may be spin-coated or otherwise placed on top of the silicon layer. For subsequent patterning by electron beam lithography, sesquisiloxane may be used for the resist. Alternatively, for optical lithography, a photoresist such as polymethyl methacrylate (PMMA) may be used. HBr-chemistry-based reactive-ion etching (RIE) may then be employed to etch the mask pattern into the silicon layer. After the resist has been removed, the patterned silicon structures (e.g., waveguides, resonators, etc.) appear as raised structures on the silica layer underneath. For photonics applications, the silica layer is preferably about 2-3 μm thick, which serves to avoid optical loss by leakage into the silicon substrate.

Active structures, such as optical modulators, may be created by doping certain regions. Regions not to be doped may be protected by one or more additional masks, formed, for example, of silicon nitride, and patterned by lithography and etching. Doping may be achieved by ion implantation through a mask, or by thermal diffusion in gas atmosphere containing the ion(s) of interest. Boron may be used for p-type doping, and arsenic or phosphorus may be used for n-type doping. Typical dopant concentrations are between $10^{16}$ and $10^{19}$ ions per cubic centimeter, depending on the p-i-n junction design.

Similar techniques may be employed to fabricate non-silicon structures, such as for III-V semiconductors like indium phosphide (InP), or for silicon nitride or other amorphous materials. Fabrication may again start with a substrate wafer, on top of which an undercladding layer with a low index of refraction, and a semiconductor layer or high-index dielectric for the waveguide core are disposed in the order listed. The waveguides are then similarly formed by lithography and etching steps. In the cases of non-crystalline core materials, such as silicon nitride, the waveguide core (SiN) layer may be deposited by plasma-enhanced chemical vapor deposition (PE-CVD), a low-pressure chemical vapor deposition (LP-CVD), or a vertical thermal reactor (VTR) process.

Although the present invention has been shown and described with respect to several preferred embodiments thereof, various changes, omissions, and additions to the form and detail thereof, may be made therein, without departing from the spirit and scope of the invention.

What is claimed is:

1. An optical structure comprising:
   a waveguide;
   an optical resonator comprising (i) a multimode waveguide section at a wavelength, and (ii) a single-mode waveguide section at the wavelength, the single-mode waveguide section being coupled to at least one end of the multimode waveguide section and comprising a coupling region coupled to the waveguide; and
   a first transition region and a second transition region, each transition region comprising a tapered waveguide section, a first end of the first transition region being coupled to the single-mode waveguide section, a second end of the first transition region being coupled to the multimode waveguide section, and a first end of the second transition region being coupled to the multimode waveguide section.

2. The optical structure of claim 1 further comprising at least one attachment disposed on the multimode waveguide section.

3. The optical structure of claim 2 wherein the optical resonator forms a closed loop ring resonator.

4. The optical structure of claim 2 wherein (i) the at least one attachment comprises a core material, and (ii) the multimode waveguide section comprises the same core material.

5. The optical structure of claim 2 wherein the at least one attachment comprises a region of positively doped semiconductor material.

6. The optical structure of claim 2 wherein the at least one attachment comprises a region of negatively doped semiconductor material.

7. The optical structure of claim 2 wherein the at least one attachment comprises a region of positively doped semiconductor material, and a region of negatively doped semiconductor material.

8. The optical structure of claim 1 wherein
the single-mode waveguide section has a first core cross section and supports at least one mode;
the multi-mode waveguide section has a second core cross section different from the first core cross section and supports at least two modes;
each of the tapered waveguide sections has an asymmetric shape around a longitudinal axis,
a first end of the tapered waveguide section of the first transition region is connected to the single-mode waveguide section, a core cross section of the first end matching the first core cross-section,
a second end of the tapered waveguide section of the first transition region is connected to the multi-mode waveguide section, a core cross section of the second end matching the second core cross section; and
a central axis of the single-mode waveguide section is shifted laterally with respect to a central axis of the multi-mode waveguide.

9. The optical structure of claim 1 wherein
the single-mode waveguide section has a first core cross section and supports at least one mode;
the multi-mode waveguide section has a second core cross section different from the first core cross section and supports at least two modes;
the tapered waveguide section has a symmetric shape around a longitudinal axis;
a first end of the tapered waveguide section of the first transition region is connected to the single-mode waveguide section, a core cross section of the first end matching the first core cross-section;
a second end of the tapered waveguide section of the first transition region is connected to the multi-mode waveguide section, a core cross section of the second end matching the second core cross section; and
a central axis of the single-mode waveguide section is approximately aligned with respect to a central axis of the multi-mode waveguide.

10. The optical structure of claim 9, wherein each tapered section comprises:
an intermediate multimode waveguide having a third core cross section different from the second core cross section and supporting at least two modes;
a first tapered waveguide subsection, wherein (i) a first end of the first tapered waveguide subsection is connected to the single-mode waveguide section, a core cross section of the first end of the first tapered subsection matching the first core cross section, and (ii) a second end of the first tapered waveguide subsection is connected to the intermediate multimode waveguide section, a core cross section of the second end of the first tapered waveguide subsection matching the third core cross section; and
a second tapered waveguide subsection, wherein (i) a first end of the second tapered waveguide subsection is connected to the intermediate multimode waveguide, a core cross section of the first end of the second tapered waveguide subsection matching the third core cross section, and (ii) a second end of the second tapered waveguide subsection is connected to the multimode waveguide section, a core cross section of the second end of the second tapered waveguide matching the second core cross section,
and further wherein a length of the intermediate multimode waveguide, a length of the first tapered waveguide subsection, and a length of the second tapered waveguide subsection cooperate to cause a desired wavelength-dependent distribution of power from a mode in the single-mode waveguide section to two modes in the multimode waveguide section.

* * * * *